US012690037B2

(12) United States Patent
Wang et al.

(10) Patent No.: US 12,690,037 B2
(45) Date of Patent: Jul. 21, 2026

(54) NETWORK INDICATION OF MEDIUM ACCESS CONTROL (MAC) CONTROL ELEMENT (CE) ASSEMBLY RULES

(71) Applicant: QUALCOMM Incorporated, San Diego, CA (US)

(72) Inventors: Hua Wang, Basking Ridge, NJ (US); Sony Akkarakaran, Poway, CA (US); Jelena Damnjanovic, Del Mar, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 400 days.

(21) Appl. No.: 17/876,357

(22) Filed: Jul. 28, 2022

(65) Prior Publication Data

US 2024/0040566 A1     Feb. 1, 2024

(51) Int. Cl.
*H04W 72/20*      (2023.01)
*H04W 72/566*     (2023.01)
*H04W 80/02*      (2009.01)

(52) U.S. Cl.
CPC ......... *H04W 72/20* (2023.01); *H04W 72/569* (2023.01); *H04W 80/02* (2013.01)

(58) Field of Classification Search
None
See application file for complete search history.

(56) References Cited

U.S. PATENT DOCUMENTS

| | | | | |
|---|---|---|---|---|
| 2018/0054804 | A1* | 2/2018 | Luo | H04W 72/02 |
| 2018/0270698 | A1* | 9/2018 | Babaei | H04W 72/21 |
| 2021/0127402 | A1 | 4/2021 | Lee et al. | |
| 2021/0400713 | A1* | 12/2021 | He | H04W 72/21 |
| 2022/0217715 | A1* | 7/2022 | Bae | H04W 72/21 |
| 2022/0225382 | A1* | 7/2022 | Yu | H04W 72/569 |
| 2022/0400396 | A1* | 12/2022 | Alfarhan | H04W 72/20 |
| 2023/0089996 | A1* | 3/2023 | Kim | H04W 72/21 |
| | | | | 370/329 |
| 2023/0189333 | A1* | 6/2023 | Liu | H04W 74/06 |
| | | | | 370/329 |
| 2024/0090042 | A1* | 3/2024 | Dashtaki | H04W 72/21 |
| 2024/0314625 | A1* | 9/2024 | Muhammad | H04W 72/21 |
| 2024/0334503 | A1* | 10/2024 | Freda | H04W 88/04 |

OTHER PUBLICATIONS

International Search Report and Written Opinion—PCT/US2023/025081—ISA/EPO—Sep. 18, 2023.

* cited by examiner

*Primary Examiner* — Gregory B Sefcheck
*Assistant Examiner* — Benjamin Peter Welte
(74) *Attorney, Agent, or Firm* — Seyfarth Shaw LLP

(57)     ABSTRACT

A method for wireless communication by a user equipment (UE), comprising: receiving, from a network node, a message indicating an update to a current truncated medium access control (MAC) control element (CE) (MAC-CE) assembly procedure at the UE. The update may include one or both of a change in a buffer status report (BSR) priority assigned to one or more BSRs associated with one or more logical channel groups (LCGs) of a group of LCGs or a change in a MAC-CE threshold size. The method also includes assembling a truncated MAC-CE based on the update to the current truncated MAC-CE assembly procedure. The method further includes transmitting, to the network node via a transport block, the truncated MAC-CE.

25 Claims, 11 Drawing Sheets

Communications Manager

MAC-CE Configuration Component

830

MAC-CE Assembly Component

840

808

Receiver

810

Transmitter

820

900

902 — RECEIVING, FROM A NETWORK NODE, A MESSAGE INDICATING AN UPDATE TO A CURRENT TRUNCATED MEDIUM ACCESS CONTROL (MAC) CONTROL ELEMENT (CE) (MAC-CE) ASSEMBLY PROCEDURE AT THE USER EQUIPMENT (UE)

904 — ASSEMBLING A TRUNCATED MAC-CE BASED ON THE UPDATE TO THE CURRENT TRUNCATED MAC-CE ASSEMBLY PROCEDURE

906 — TRANSMITTING, TO THE NETWORK NODE VIA A TRANSPORT BLOCK (TB), THE TRUNCATED MAC-CE

Communications Manager

BSR Parameter Component

1030

MAC-CE Configuration
Component

1040

Receiver

1010

Transmitter

1020

1015

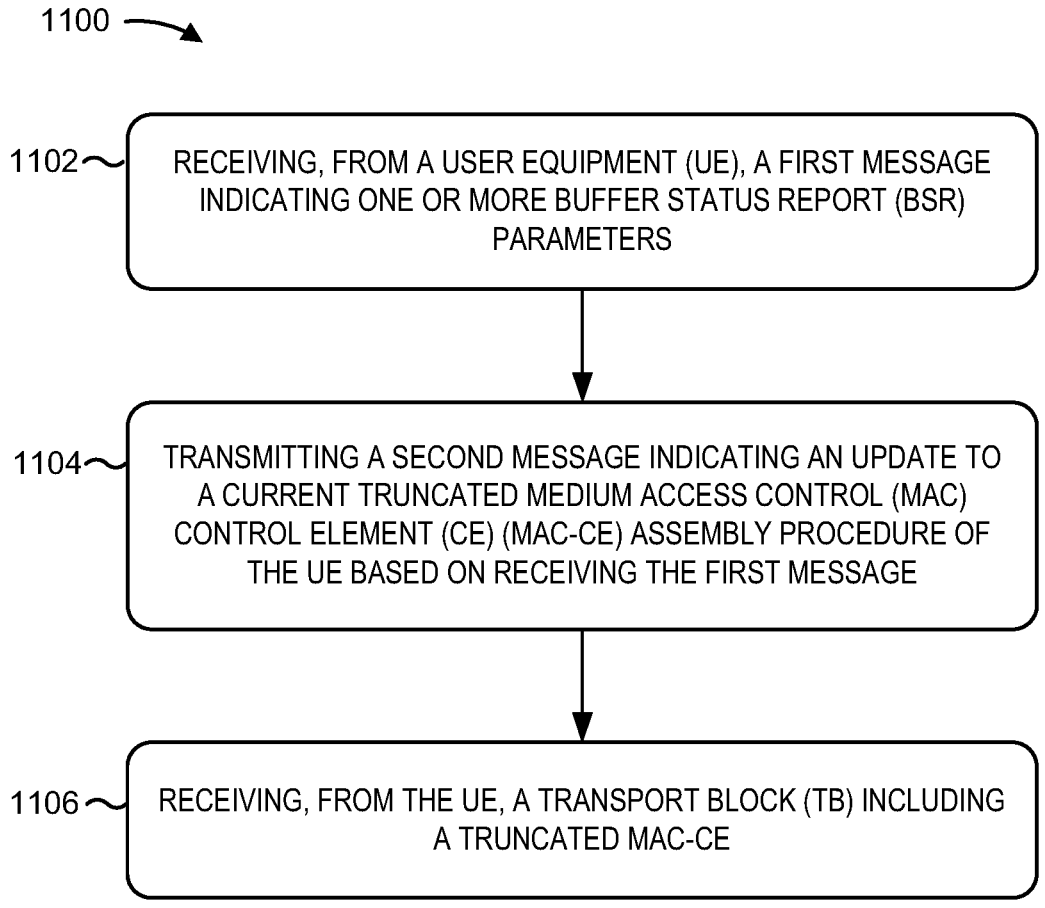

1100

1102 — RECEIVING, FROM A USER EQUIPMENT (UE), A FIRST MESSAGE INDICATING ONE OR MORE BUFFER STATUS REPORT (BSR) PARAMETERS

1104 — TRANSMITTING A SECOND MESSAGE INDICATING AN UPDATE TO A CURRENT TRUNCATED MEDIUM ACCESS CONTROL (MAC) CONTROL ELEMENT (CE) (MAC-CE) ASSEMBLY PROCEDURE OF THE UE BASED ON RECEIVING THE FIRST MESSAGE

1106 — RECEIVING, FROM THE UE, A TRANSPORT BLOCK (TB) INCLUDING A TRUNCATED MAC-CE

*FIG. 11*

NETWORK INDICATION OF MEDIUM ACCESS CONTROL (MAC) CONTROL ELEMENT (CE) ASSEMBLY RULES

FIELD OF THE DISCLOSURE

The present disclosure relates generally to wireless communications, and more specifically to rules for assembling a medium access control (MAC) control element (CE) (MAC-CE) at a user equipment (UE).

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunications standards to provide a common protocol that enables different wireless devices to communicate on a municipal, national, regional, and even global level. An example telecommunications standard is fifth generation (5G) new radio (NR). 5G NR is part of a continuous mobile broadband evolution promulgated by Third Generation Partnership Project (3GPP) to meet new requirements associated with latency, reliability, security, scalability (for example, with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the fourth generation (4G) long term evolution (LTE) standard. Narrowband (NB)-Internet of things (IoT) and enhanced machine-type communications (eMTC) are a set of enhancements to LTE for machine type communications. There exists a need for further improvements in 5G NR technology. These improvements may also be applicable to other multi-access technologies and the telecommunications standards that employ these technologies.

In some wireless communication systems, a user equipment (UE) and a network node may exchange control information via one or more of a variety of message types, such as a radio resource control (RRC) message, a non-stratum access layer (NAS) message, or a medium access control (MAC) control element (CE) (MAC-CE). In some examples, the UE may transmit a MAC-CE to the network node via an uplink shared channel (for example, a physical uplink shared channel (PUSCH)) for MAC layer communications. In some such examples, a size of the MAC-CE may be greater than an amount of available uplink shared channel resources. In such examples, the UE may truncate the MAC-CE based on one or more rules, such that the MAC-CE fits within the available uplink shared channel resources and transmit the truncated MAC-CE via the uplink shared channel.

SUMMARY

In one aspect of the present disclosure, a method for wireless communication at a user equipment (UE) includes receiving, from a network node, a message indicating an update to a current truncated medium access control (MAC) control element (CE) (MAC-CE) assembly procedure at the UE. The update may include one or both of a change in a buffer status report (BSR) priority assigned to one or more BSRs associated with one or more logical channel groups (LCGs) of a group of LCGs or a change in a MAC-CE threshold size. The method further includes assembling a truncated MAC-CE based on the update to the current truncated MAC-CE assembly procedure. The method still further includes transmitting, to the network node via a transport block (TB), the truncated MAC-CE.

Another aspect of the present disclosure is directed to an apparatus including means for receiving, from a network node, a message indicating an update to a current truncated MAC-CE assembly procedure at the UE. The update may include one or both of a change in a BSR priority assigned to one or more BSRs associated with one or more LCGs of a group of LCGs or a change in a MAC-CE threshold size. The apparatus further includes means for assembling a truncated MAC-CE based on the update to the current truncated MAC-CE assembly procedure. The apparatus still further includes means for transmitting, to the network node via a TB, the truncated MAC-CE.

In another aspect of the present disclosure, a non-transitory computer-readable medium with non-transitory program code recorded thereon is disclosed. The program code is executed by a processor and includes program code to receive, from a network node, a message indicating an update to a current truncated MAC-CE assembly procedure at the UE. The update may include one or both of a change in a BSR priority assigned to one or more BSRs associated with one or more LCGs of a group of LCGs or a change in a MAC-CE threshold size. The program code further includes program code to assemble a truncated MAC-CE based on the update to the current truncated MAC-CE assembly procedure. The program code still further includes program code to transmit, to the network node via a TB, the truncated MAC-CE.

Another aspect of the present disclosure is directed to an apparatus having a processor, and a memory coupled with the processor and storing instructions operable, when executed by the processor, to cause the apparatus to receive, from a network node, a message indicating an update to a current truncated MAC-CE assembly procedure at the UE. The update may include one or both of a change in a BSR priority assigned to one or more BSRs associated with one or more LCGs of a group of LCGs or a change in a MAC-CE threshold size. Execution of the instructions also cause the apparatus to assemble a truncated MAC-CE based on the update to the current truncated MAC-CE assembly procedure. Execution of the instructions further cause the apparatus to transmit, to the network node via a TB, the truncated MAC-CE.

In one aspect of the present disclosure, a method for wireless communication at a network node includes receiving, from a UE, a first message indicating one or more BSR parameters. The method further includes transmitting a second message indicating an update to a current truncated MAC-CE assembly procedure of the UE based on receiving the first message. The update may include one or both of a change in a BSR priority assigned to one or more BSRs associated with one or more LCGs of a group of LCGs or a change in a MAC-CE threshold size. The method still further includes receiving, from the UE, a TB including a truncated MAC-CE. The truncated MAC-CE may be assembled at the UE based on the update to the current MAC-CE assembly procedure.

Another aspect of the present disclosure is directed to an apparatus including means for receiving, from a UE, a first message indicating one or more BSR parameters. The apparatus further includes means for transmitting a second message indicating an update to a current truncated MAC-CE assembly procedure of the UE based on receiving the first message. The update may include one or both of a change in a BSR priority assigned to one or more BSRs associated with one or more LCGs of a group of LCGs or a change in a MAC-CE threshold size. The apparatus still further includes means for receiving, from the UE, a TB including a truncated MAC-CE. The truncated MAC-CE may be assembled at the UE based on the update to the current MAC-CE assembly procedure.

In another aspect of the present disclosure, a non-transitory computer-readable medium with non-transitory program code recorded thereon is disclosed. The program code is executed by a processor and includes program code to receive, from a UE, a first message indicating one or more BSR parameters. The program code further includes program code to transmit a second message indicating an update to a current truncated MAC-CE assembly procedure of the UE based on receiving the first message. The update may include one or both of a change in a BSR priority assigned to one or more BSRs associated with one or more LCGs of a group of LCGs or a change in a MAC-CE threshold size. The program code still further includes program code to receive, from the UE, a TB including a truncated MAC-CE. The truncated MAC-CE may be assembled at the UE based on the update to the current MAC-CE assembly procedure.

Another aspect of the present disclosure is directed to an apparatus having a processor, and a memory coupled with the processor and storing instructions operable, when executed by the processor, to cause the apparatus to receive, from a UE, a first message indicating one or more BSR parameters. Execution of the instructions also cause the apparatus to transmit a second message indicating an update to a current truncated MAC-CE assembly procedure of the UE based on receiving the first message. The update may include one or both of a change in a BSR priority assigned to one or more BSRs associated with one or more LCGs of a group of LCGs or a change in a MAC-CE threshold size. Execution of the instructions further cause the apparatus to receive, from the UE, a TB including a truncated MAC-CE. The truncated MAC-CE may be assembled at the UE based on the update to the current MAC-CE assembly procedure.

Aspects generally include a method, apparatus, system, computer program product, non-transitory computer-readable medium, user equipment, base station, wireless communication device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 5 is a block diagram illustrating an example of a vehicle-to-everything (V2X) system with a roadside unit (RSU), according to aspects of the present disclosure.

FIG. 11 is a flow diagram illustrating an example of a process performed by a network node, in accordance with various aspects of the present disclosure.

DETAILED DESCRIPTION

Figure 1:
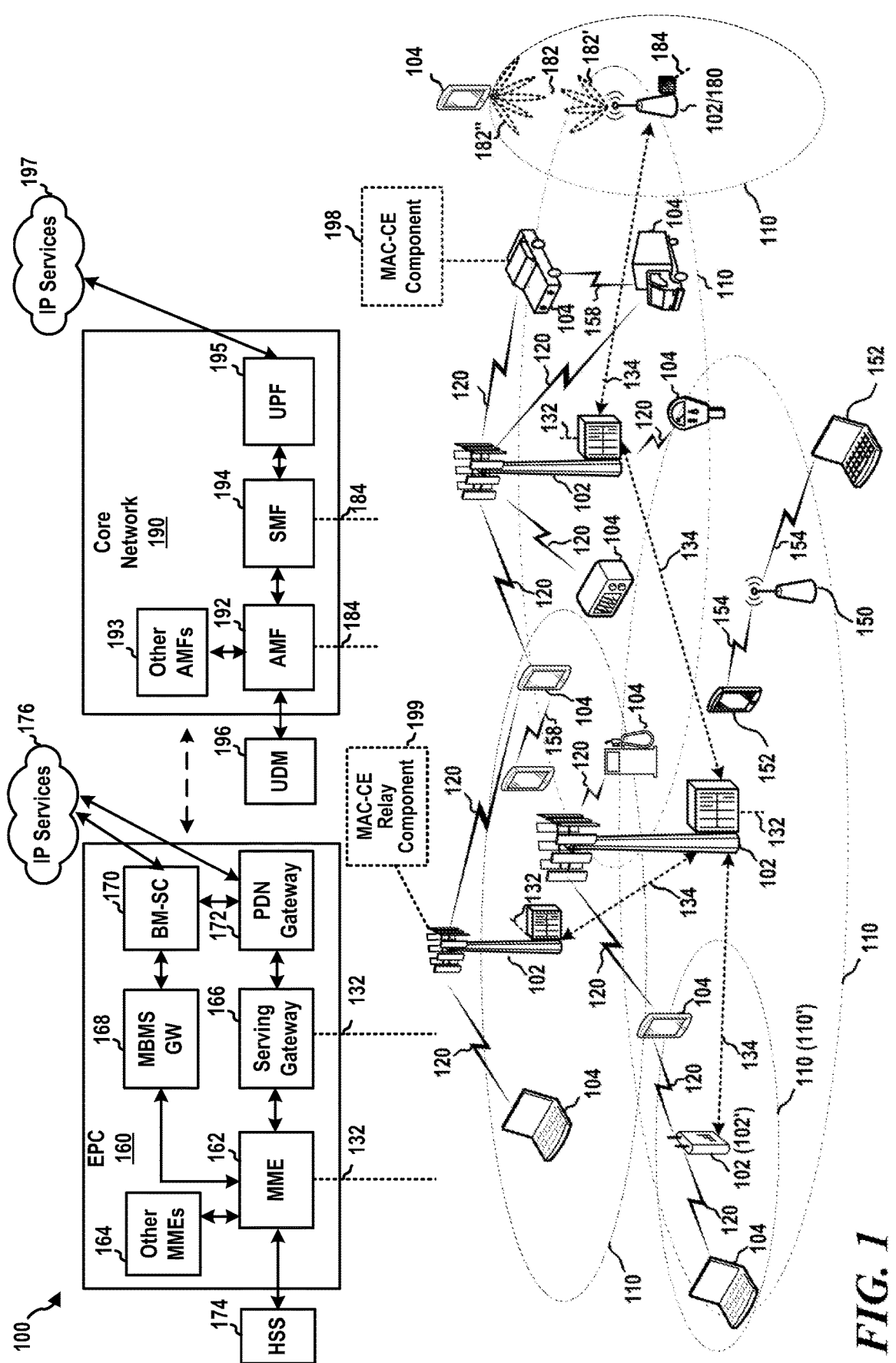
FIG. 1 is a diagram illustrating an example of a wireless communications system and an access network.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure disclosed, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof whether such elements are implemented as hardware or software depends upon the particular application and design constraints imposed on the overall system.

It should be noted that while aspects may be described using terminology associated with 5G wireless technologies, aspects of the present disclosure can be applied in later generations, including for 6G wireless technologies, or in other wireless communications systems.

In cellular communications networks, wireless devices may generally communicate with each other via access links with one or more network entities such as a base station or scheduling entity. Some cellular networks may also support device-to-device (D2D) communications that enable discovery of, and communications among, nearby devices using direct links between devices (for example, without passing through a base station, relay, or other network entity). D2D communications may also be referred to as point-to-point (P2P) or sidelink communications. D2D communications may be implemented using licensed or unlicensed bands. Using D2D communications, devices can avoid some of the overhead that would otherwise be involved with routing to and from a network entity. D2D communications can also enable mesh networking and device-to-network relay functionality.

Vehicle-to-everything (V2X) communication is an example of D2D communication that is specifically geared toward automotive use cases.

V2X communications may enable autonomous vehicles to communicate with each other. In some examples, V2X communications may enable a group of autonomous vehicles to share respective sensor information. For example, each autonomous vehicle may include multiple sensors or sensing technologies (for example, light detection and ranging (LiDAR), radar, cameras, etc.). In most cases, an autonomous vehicle's sensors are limited to detecting objects within the sensors' line of sight. In contrast, based on the sensor information shared via V2X communications, one or more autonomous vehicles in the group of autonomous vehicles may be made aware of an out of sight object. In such examples, the object may be within a line of sight of sensors associated with another autonomous vehicle in the group of autonomous vehicles. Additionally, or alternatively, based on the sensor information shared via V2X communications, two or more autonomous vehicle in the group of autonomous vehicles may coordinate one or more actions, such as avoiding the object or maintaining a pre-determined distance between the two or more autonomous vehicles.

Sidelink (SL) communication is another example of D2D communication that enables a user equipment (UE) to communicate with another UE without tunneling through a base station and/or a core network. Sidelink communications can be communicated over a physical sidelink control channel (PSCCH) and a physical sidelink shared channel (PSSCH). The PSCCH and PSSCH are similar to a physical downlink control channel (PDCCH) and a physical downlink shared channel (PDSCH) in downlink (DL) communications between a base station and a UE. For instance, the PSCCH may carry sidelink control information (SCI) and the PSCCH may carry sidelink data (for example, user data). Each PSCCH is associated with a corresponding PSSCH, where SCI in a PSCCH may carry reservation and/or scheduling information for a sidelink data transmission in the associated PSSCH. Use cases for sidelink communications may include, among others, V2X, industrial Internet of Things (IoT) (IIoT), and/or NR-lite.

In some wireless communication systems, a UE and a network node may exchange control information via one or more of a variety of message types, such as a radio resource control (RRC) message, a non-stratum access layer (NAS) message, or a medium access control (MAC) control element (CE) (MAC-CE). In some examples, the UE may transmit a MAC-CE to the network node via an uplink shared channel (for example, a physical uplink shared channel (PUSCH)) for MAC layer communications, such as for providing a buffer status report (BSR) or initiating a beam failure recovery (BFR) procedure. In some examples, a size of the MAC-CE may be greater than an amount of available uplink shared channel resources. In conventional systems, the network node may not control how the UE truncates or assembles a payload, such as a BSR, of the MAC-CE. Rather, in such conventional systems, the UE may assemble the truncated MAC-CE based on one or more pre-defined rules (for example, pre-defined in a wireless standard). In some such conventional systems, based on the one or more pre-defined rules, the UE may include, in the truncated MAC-CE, only BSRs associated with high priority logical channels. The truncated MAC-CE may then be transmitted via the uplink shared channel. In such conventional systems, the network node cannot dynamically change a priority assigned to one or more BSRs. Therefore, the network node has no control over the BSRs included in the truncated MAC-CE.

Various aspects of the present disclosure generally relate to assembling a truncated MAC-CE, and specifically to indicating, by a network node to a UE, an update to one or more current truncated MAC-CE assembly rules or procedures. In some examples, the update may include one or both of a change in a BSR priority assigned to one or more BSRs associated with one or more logical channel groups (LCGs) of a group of LCGs or a change in a MAC-CE threshold size. In some examples, the network node receives, from the UE, a message indicating one or more BSR parameters, such as one or more of a respective identifier of each LCG associated with current network traffic or a respective buffer size of one or more buffers. Each buffer size may be associated with a single-bit buffer size field. In some such examples, the network node transmits a message indicating the update based on the one or more BSR parameters. For example, the update may change the BSR priority to assign a highest priority to one or more BSRs associated with one or more LCG that include network traffic. In another example, the update may change the BSR priority to assign the highest priority to each BSR with a respective buffer size that is greater a threshold size. In some other such examples, the network node transmits the update regardless of whether the network node received the one or more BSR parameters. For example, the update may change the BSR priority to assign a highest priority each BSR associated with a specific type, size, or format. In another example, the update may change the BSR priority to assign a highest priority each BSR associated with a specific LCG. Subsequently, the UE may then assemble the truncated MAC-CE based on the update to the current truncated MAC-CE assembly procedure and transmit the truncated MAC-CE to the network node via a transport block (TB).

Particular aspects of the subject matter described in this disclosure may be implemented to realize one or more of the following potential advantages. In some examples, the described techniques may dynamically change a BSR priority assigned to one or more BSRs associated with one or more LCGs of a group of LCGs so as to allow the network node to control the payload included in the truncated MAC-CE. Additionally, or alternatively, the described techniques may dynamically change a MAC-CE threshold size so as to reduce network overhead. The reduced network overhead may improve overall network quality.

FIG. 1 is a diagram illustrating an example of a wireless communications system and an access network 100. The wireless communications system (also referred to as a wireless wide area network (WWAN)) includes base stations 102, UEs 104, an evolved packet core (EPC) 160, and another core network 190 (for example, a 5G core (5GC)). The base stations 102 may include macrocells (high power cellular base station) and/or small cells 102' (low power cellular base station). The macrocells include base stations. The small cells 102' include femtocells, picocells, and microcells.

The base stations 102 configured for 4G LTE (collectively referred to as evolved universal mobile telecommunications system (UMTS) terrestrial radio access network (E-UTRAN)) may interface with the EPC 160 through backhaul links 132 (for example, S1 interface). The base stations 102 configured for 5G NR (collectively referred to as next generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (for example, handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (for example, through the EPC 160 or core network 190) with each other over backhaul links 134 (for example, X2 interface). The backhaul links 134 may be wired or wireless.

The base stations 102 may wirelessly communicate with the UEs 104. Each of the base stations 102 may provide communications coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include home evolved Node Bs (eNBs) (HeNBs), which may provide service to a restricted group known as a closed subscriber group (CSG). The communications links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communications links 120 may use multiple-input and multiple-output (MIMO) antenna technology, including spatial multiplexing, beamforming, and/or transmit diversity. The communications links may be through one or more carriers. The base stations 102/UEs 104 may use spectrum up to Y MHz (for example, 5, 10, 15, 20, 100, 400, etc., MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (for example, more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communications link 158. The D2D communications link 158 may use the DL/UL WWAN spectrum. The D2D communications link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communications may be through a variety of wireless D2D communications systems, such as FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communications links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (for example, macro base station), may include a NR BS, a Node B, a 5G node B, an eNB, a gNodeB (gNB), an access point, a transmit and receive point (TRP), a network node, a network entity, and/or the like. A base station can be implemented as an aggregated base station, as a disaggregated base station, an integrated access and backhaul (IAB) node, a relay node, a sidelink node, etc. The base station can be implemented in an aggregated or monolithic base station architecture, or alternatively, in a disaggregated base station architecture, and may include one or more of a central unit (CU), a distributed unit (DU), a radio unit (RU), a near-real time (near-RT) RAN intelligent controller (RIC), or a non-real time (non-RT) RIC. Some base stations, such as gNB 180 may operate in a traditional sub 6 GHz spectrum, in millimeter wave (mmWave) frequencies, and/or near mmWave frequencies in communication with the UE 104.

When the gNB 180 operates in mmWave or near mmWave frequencies, the gNB 180 may be referred to as an mmWave base station. Extremely high frequency (EHF) is part of the radio frequency (RF) in the electromagnetic spectrum. EHF has a range of 30 GHz to 300 GHz and a wavelength between 1 millimeter and 10 millimeters. Radio waves in the band may be referred to as a millimeter wave. Near mmWave may extend down to a frequency of 3 GHz with a wavelength of 100 millimeters. The super high frequency (SHF) band extends between 3 GHz and 30 GHz, also referred to as centimeter wave. Communications using the mmWave/near mmWave radio frequency band (for example, 3 GHz-300 GHz) has extremely high path loss and a short range. The mmWave base station 180 may utilize beam-forming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a mobility management entity (MME) 162, other MMEs 164, a serving gateway 166, a multimedia broadcast multicast service (MBMS) gateway 168, a broadcast multicast service center (BM-SC) 170, and a packet data network (PDN) gateway 172. The MME 162 may be in communication with a home subscriber server (HSS) 174. The MME 162 is the control node that processes the signaling between the UEs 104 and the EPC 160. Generally, the MME 162 provides bearer and connection management. All user Internet protocol (IP) packets are transferred through the serving gateway 166, which itself is connected to the PDN gateway 172. The PDN gateway 172 provides UE IP address allocation as well as other functions. The PDN gateway 172 and the BM-SC 170 are connected to the IP services 176. The IP services 176 may include the Internet, an intranet, an IP multimedia subsystem (IMS), a PS streaming service, and/or other IP services. The BM-SC 170 may provide functions for MBMS user service provisioning and delivery. The BM-SC 170 may serve as an entry point for content provider MBMS transmission, may be used to authorize and initiate MBMS bearer services within a public land mobile network (PLMN), and may be used to schedule MBMS transmissions. The MBMS gateway 168 may be used to distribute MBMS traffic to the base stations 102 belonging to a multicast broadcast single frequency network (MBSFN) area broadcasting a particular service, and may be responsible for session management (start/stop) and for collecting evolved MBMS (eMBMS) related charging information.

The core network 190 may include an access and mobility management function (AMF) 192, other AMFs 193, a session management function (SMF) 194, and a user plane function (UPF) 195. The AMF 192 may be in communication with a unified data management (UDM) 196. The AMF 192 is the control node that processes the signaling between the UEs 104 and the core network 190. Generally, the AMF 192 provides quality of service (QoS) flow and session management. All user Internet protocol (IP) packets are transferred through the UPF 195. The UPF 195 provides UE IP address allocation as well as other functions. The UPF 195 is connected to the IP services 197. The IP services 197 may include the Internet, an intranet, an IP multimedia subsystem (IMS), a PS streaming service, and/or other IP services.

The base station 102 may also be referred to as a gNB, Node B, evolved Node B (eNB), an access point, a base transceiver station, a radio base station, a radio transceiver, a transceiver function, a basic service set (BSS), an extended service set (ESS), a transmit and receive point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (for example, MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (for example, a parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terminology.

Figure 9:
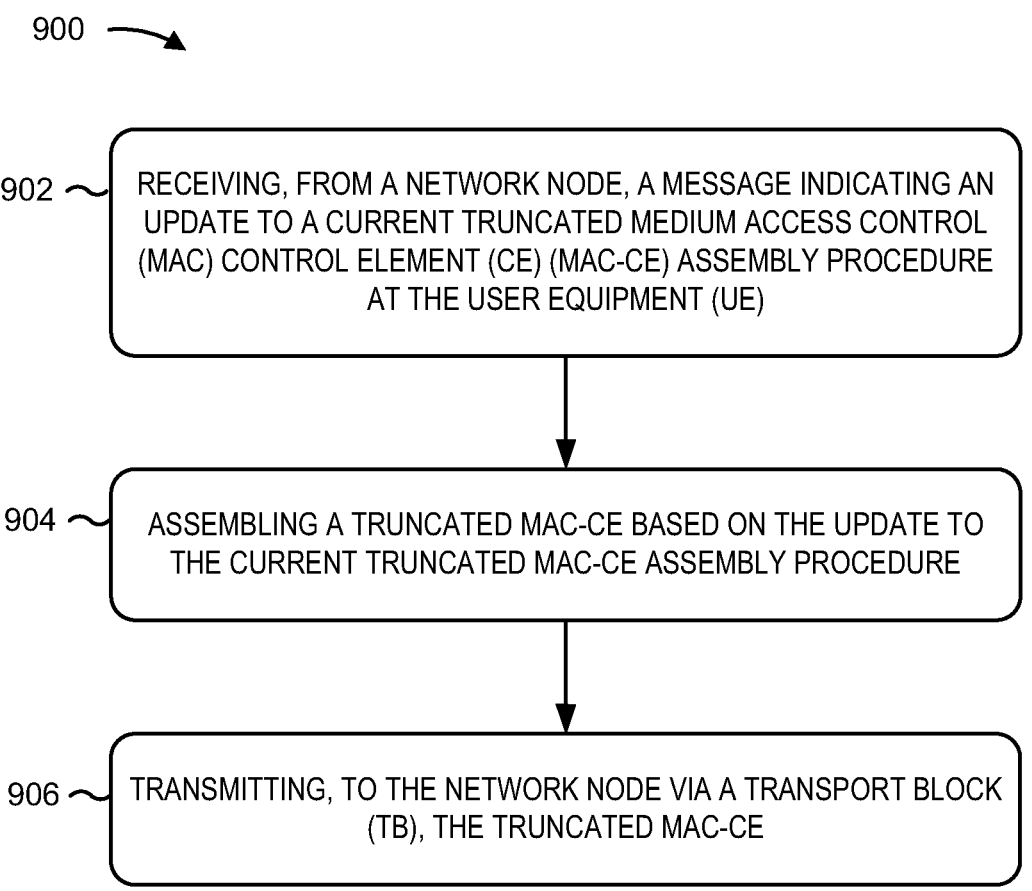
FIG. 9 is a flow diagram illustrating an example process performed by a UE, in accordance with various aspects of the present disclosure.

Referring again to FIG. 1, the UE 104 may include a MAC-CE component 198 configured to perform the operations disclosed with reference to FIG. 9. The base station 102 may include a MAC-CE relay component 199 configured to perform the operations disclosed with reference to FIG. 11.

Although the following description may be focused on 5G NR, it may be applicable to other similar areas, such as LTE, LTE-A, CDMA, GSM, and other wireless technologies.

Figure 2:
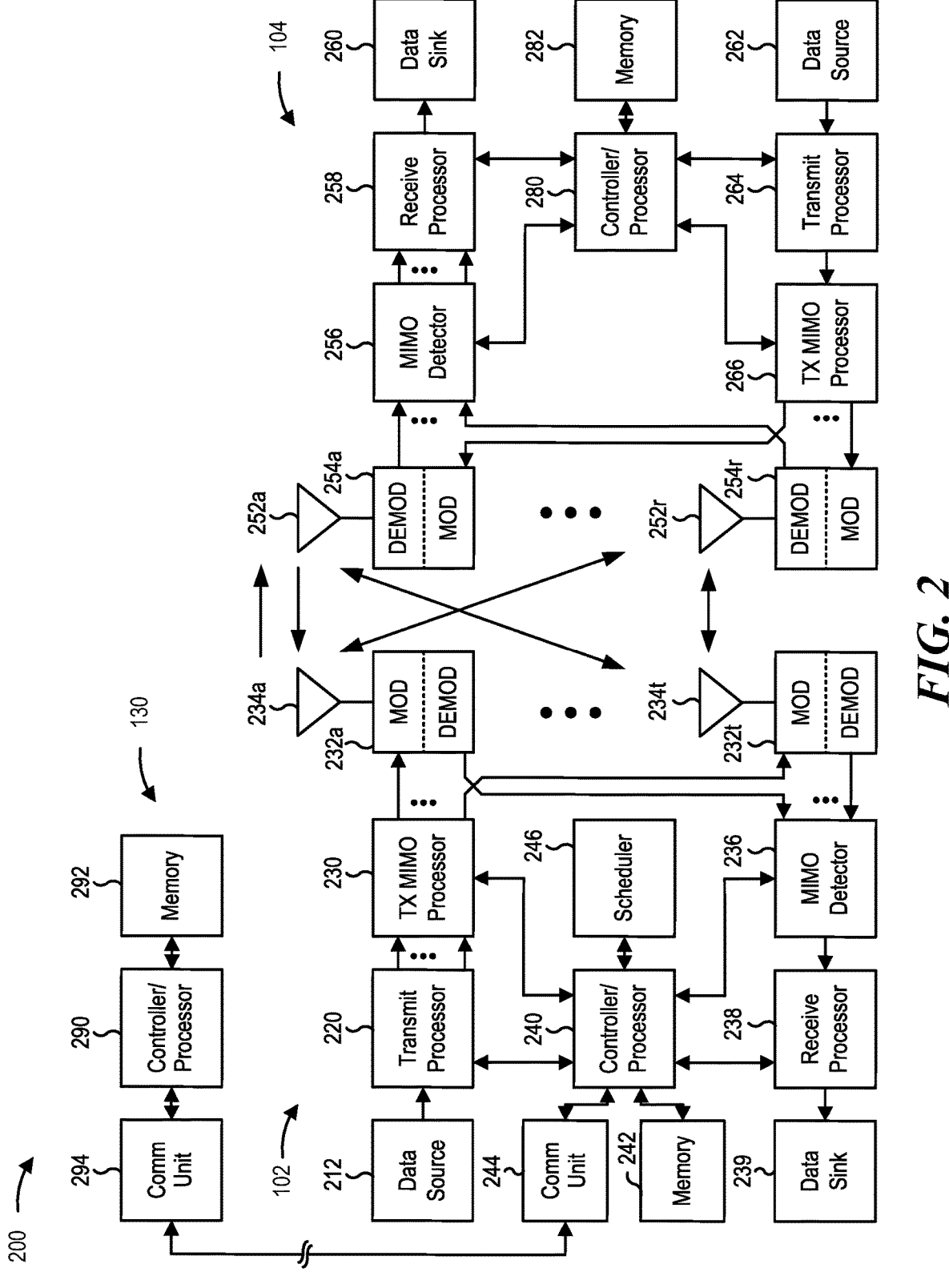
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 102 and UE 104, which may be one of the base stations and one of the UEs in FIG. 1, respectively. The base station 102 may be equipped with T antennas 234a through 234t, and UE 104 may be equipped with R antennas 252a through 252r, where in general T≥1 and R≥1.

At the base station 102, a transmit processor 220 may receive data from a data source 212 for one or more UEs, select one or more modulation and coding schemes (MCS) for each UE based at least in part on channel quality indicators (CQIs) received from the UE, process (for example, encode and modulate) the data for each UE based at least in part on the MCS(s) selected for the UE, and provide data symbols for all UEs. Decreasing the MCS lowers throughput but increases reliability of the transmission. The transmit processor 220 may also process system information (for example, for semi-static resource partitioning information (SRPI) and/or the like) and control information (for example, CQI requests, grants, upper layer signaling, and/or the like) and provide overhead symbols and control symbols. The transmit processor 220 may also generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, and/or the reference symbols, if applicable, and may provide T output symbol streams to T modulators (MODs) 232a through 232t. Each modulator 232 may process a respective output symbol stream (for example, for orthogonal frequency division multiplexing (OFDM) and/or the like) to obtain an output sample stream. Each modulator 232 may further process (for example, convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 104, antennas 252a through 252r may receive the downlink signals from the base station 102 and/or other base stations and may provide received signals to demodulators (DEMODs) 254a through 254r, respectively. Each demodulator 254 may condition (for example, filter, amplify, downconvert, and digitize) a received signal to obtain input samples. Each demodulator 254 may further process the input samples (for example, for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (for example, demodulate and decode) the detected symbols, provide decoded data for the UE 104 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 104 may be included in a housing.

On the uplink, at the UE 104, a transmit processor 264 may receive and process data from a data source 262 and control information (for example, for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (for example, for discrete Fourier transform spread (DFT-s)-OFDM, CP-OFDM, and/or the like), and transmitted to the base station 102. At the base station 102, the uplink signals from the UE 104 and other UEs may be received by the antennas 234, processed by the demodulators 254, detected by a MIMO detector 236 if applicable, and further processed by a receive processor 238 to obtain decoded data and control information sent by the UE 104. The receive processor 238 may provide the decoded data to a data sink 239 and the decoded control information to a controller/processor 240. The base station 102 may include communications unit 244 and communicate to the core network 130 via the communications unit 244. The core network 130 may include a communications unit 294, a controller/processor 290, and a memory 292.

The controller/processor 240 of the base station 102, the controller/processor 280 of the UE 104, and/or any other component(s) of FIG. 2 may perform one or more techniques associated with configuring a relay-based sidelink network as described in more detail elsewhere. For example, the controller/processor 240 of the base station 102, the controller/processor 280 of the UE 104, and/or any other component(s) of FIG. 2 may perform or direct operations of, for example, the processes of FIGS. 10 and 12 and/or other processes as described. Memories 242 and 282 may store data and program codes for the base station 102 and UE 104, respectively. A scheduler 246 may schedule UEs for data transmission on the downlink and/or uplink.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), an evolved NB (eNB), an NR BS, 5G NB, an access point (AP), a transmit and receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also can be implemented as virtual units (for example, a virtual central unit (VCU), a virtual distributed unit (VDU), or a virtual radio unit (VRU)).

Base station-type operations or network designs may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 3:
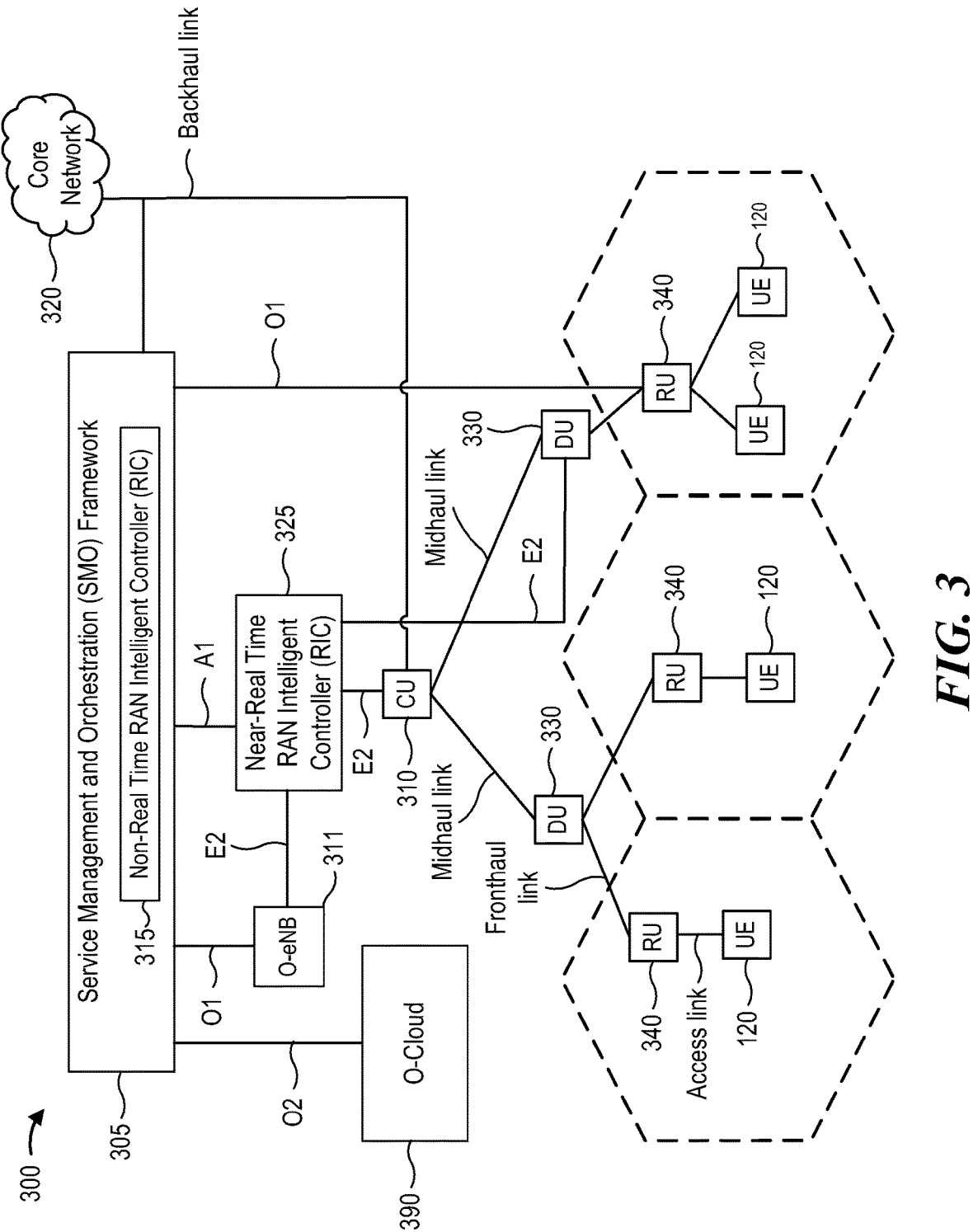
FIG. 3 is a block diagram illustrating an example disaggregated base station architecture, in accordance with various aspects of the present disclosure.

FIG. 3 shows a diagram illustrating an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (such as a near-real time (near-RT) RAN intelligent controller (RIC) 325 via an E2 link, or a non-real time (non-RT) RIC 315 associated with a service management and orchestration (SMO) framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 104 via one or more radio frequency (RF) access links. In some implementations, the UE 104 may be simultaneously served by multiple RUs 340.

Each of the units (for example, the CUs 310, the DUs 330, the RUs 340, as well as the near-RT RICs 325, the non-RT RICs 315, and the SMO framework 305) may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (for example, central unit-user plane (CU-UP)), control plane functionality (for example, central unit-control Plane (CU-CP)), or a combination thereof. In some implementations, the CU 310 can be logically split into one or more CU-UP units and one or more CU-CP units. The CU-UP unit can communicate bi-directionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the Third Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 104. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340, and near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a non-RT RIC 315 configured to support functionality of the SMO Framework 305.

The non-RT RIC 315 may be configured to include a logical function that enables non-real-time control and optimization of RAN elements and resources, artificial intelligence/machine learning (AI/ML) workflows including model training and updates, or policy-based guidance of applications/features in the near-RT RIC 325. The non-RT RIC 315 may be coupled to or communicate with (such as via an A1 interface) the near-RT RIC 325. The near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as the O-eNB 311, with the near-RT RIC 325.

In some implementations, to generate AI/ML models to be deployed in the near-RT RIC 325, the non-RT RIC 315 may receive parameters or external enrichment information from external servers. Such information may be utilized by the near-RT RIC 325 and may be received at the SMO Framework 305 or the non-RT RIC 315 from non-network data sources or from network functions. In some examples, the non-RT RIC 315 or the near-RT RIC 325 may be configured to tune RAN behavior or performance. For example, the non-RT RIC 315 may monitor long-term trends and patterns for performance and employ AI/ML models to perform corrective actions through the SMO Framework 305 (such as reconfiguration via O1) or via creation of RAN management policies (such as A1 policies).

Figure 4:
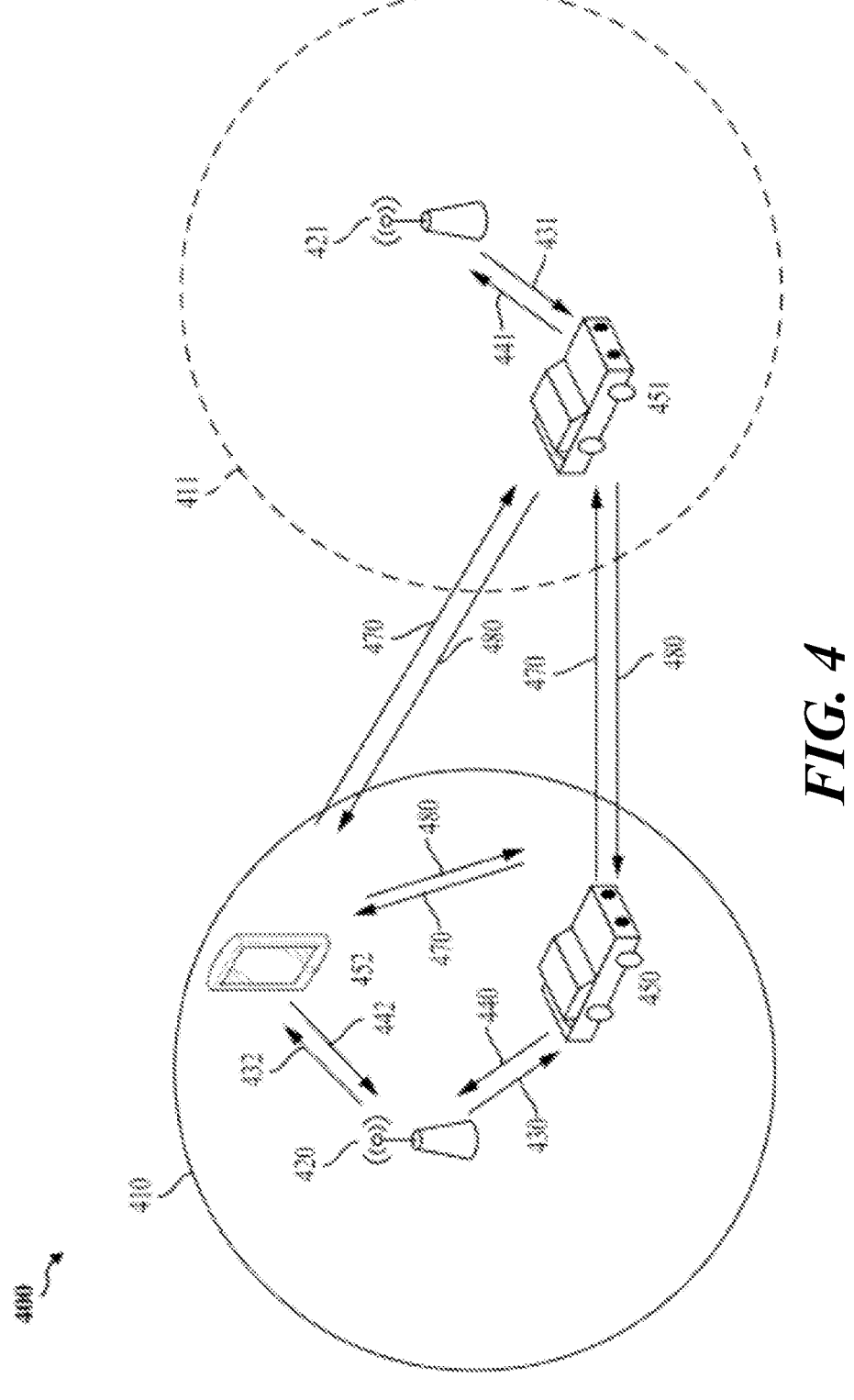
FIG. 4 is a diagram illustrating an example of a vehicle-to-everything (V2X) system, in accordance with various aspects of the present disclosure.

FIG. 4 is a diagram of a device-to-device (D2D) communications system 400, including V2X communications, in accordance with various aspects of the present disclosure. For example, the D2D communications system 400 may include V2X communications, (for example, a first UE 450 communicating with a second UE 451). In some aspects, one or both of the first UE 450 or the second UE 451 may be configured to communicate in a one or both of licensed radio frequency spectrum or a shared radio frequency spectrum.

The UEs 450, 451, and 452 may be examples of a UE 104 described with reference to FIGS. 1, 2, and 3. The shared radio frequency spectrum may be unlicensed, and therefore multiple different technologies may use the shared radio frequency spectrum for communications, including new radio (NR), LTE, LTE-Advanced, licensed assisted access (LAA), dedicated short range communications (DSRC), MuLTEFire, 4G, and the like. The foregoing list of technologies is to be regarded as illustrative, and is not meant to be exhaustive.

The D2D communications system 400 may use NR radio access technology. Of course, other radio access technologies, such as LTE radio access technology, may be used. In D2D communications (for example, V2X communications or vehicle-to-vehicle (V2V) communications), the UEs 450, 451 may be on networks of different mobile network operators (MNOs). Each of the networks may operate in its own radio frequency spectrum. For example, the air interface to a first UE 450 (for example, Uu interface) may be on one or more frequency bands different from the air interface of the second UE 451. The first UE 450 and the second UE 451 may communicate via a sidelink component carrier, for example, via the PC5 interface. In some examples, the MNOs may schedule sidelink communications between or among the UEs 450, 451 in licensed radio frequency spectrum and/or a shared radio frequency spectrum (for example, 5 GHz radio spectrum bands).

The shared radio frequency spectrum may be unlicensed, and therefore different technologies may use the shared radio frequency spectrum for communications. In some aspects, a D2D communications (for example, sidelink communications) between or among UEs 450, 451 is not scheduled by MNOs. The D2D communications system 400 may further include a third UE 452.

The third UE 452 may operate on the first network 410 (for example, of the first MNO) or another network, for example. The third UE 452 may be in D2D communications with the first UE 450 and/or second UE 451. The first base station 420 (for example, gNB) may communicate with the third UE 452 via a downlink (DL) carrier 432 and/or an uplink (UL) carrier 442. The base stations 420 and 421 may be examples of a base station 102 described with reference to FIGS. 1 and 2, or a CU 310, DU 330, or RU 340 described with reference to FIG. 3. The DL communications may be use various DL resources (for example, the DL subframes and/or the DL channels). The UL communications may be performed via the UL carrier 442 using various UL resources (for example, the UL subframes and the UL channels).

The first network 410 operates in a first frequency spectrum and includes the first base station 420 (for example, gNB) communicating at least with the first UE 450. The first base station 420 (for example, gNB) may communicate with the first UE 450 via a DL carrier 430 and/or an UL carrier 440. The DL communications may use various DL resources (for example, the DL subframes and/or the DL channels). The UL communications may be performed via the UL carrier 440 using various UL resources (for example, the UL subframes and the UL channels).

In some aspects, the second UE 451 may be on a different network from the first UE 450. In some aspects, the second UE 451 may be on a second network 411 (for example, of the second MNO). The second network 411 may operate in a second frequency spectrum (for example, a second frequency spectrum different from the first frequency spectrum) and may include the second base station 421 (for example, gNB) communicating with the second UE 451.

The second base station 421 may communicate with the second UE 451 via a DL carrier 431 and an UL carrier 441. The DL communications are performed via the DL carrier 431 using various DL resources (for example, the DL subframes (FIG. 2A) and/or the DL channels (FIG. 2B)). The UL communications are performed via the UL carrier 441 using various UL resources (for example, the UL subframes (FIG. 2C) and/or the UL channels (FIG. 2D)).

In conventional systems, the first base station 420 and/or the second base station 421 assign resources to the UEs for device-to-device (D2D) communications (for example, V2X communications and/or V2V communications). For example, the resources may be a pool of UL resources, both orthogonal (for example, one or more frequency division multiplexing (FDM) channels) and non-orthogonal (for example, code division multiplexing (CDM)/resource spread multiple access (RSMA) in each channel). The first base station 420 and/or the second base station 421 may configure the resources via the PDCCH (for example, faster approach) or RRC (for example, slower approach).

In some systems, each UE 450, 451 autonomously selects resources for D2D communications. For example, each UE 450, 451 may sense and analyze channel occupation during the sensing window. The UEs 450, 451 may use the sensing information to select resources from the sensing window. As discussed, one UE 451 may assist another UE 450 in performing resource selection. The UE 451 providing assistance may be referred to as the receiver UE or partner UE, which may potentially notify the transmitter UE 450. The transmitter UE 450 may transmit information to the receiving UE 451 via sidelink communications.

The D2D communications (for example, V2X communications and/or V2V communications) may be carried out via one or more sidelink carriers 470, 480. The one or more sidelink carriers 470, 480 may include one or more channels, such as a physical sidelink broadcast channel (PSBCH), a physical sidelink discovery channel (PSDCH), a physical sidelink shared channel (PSSCH), and a physical sidelink control channel (PSCCH), for example.

In some examples, the sidelink carriers 470, 480 may operate using the PC5 interface. The first UE 450 may transmit to one or more (for example, multiple) devices, including to the second UE 451 via the first sidelink carrier 470. The second UE 451 may transmit to one or more (for example, multiple) devices, including to the first UE 450 via the second sidelink carrier 480.

In some aspects, the UL carrier 440 and the first sidelink carrier 470 may be aggregated to increase bandwidth. In some aspects, the first sidelink carrier 470 and/or the second sidelink carrier 480 may share the first frequency spectrum (with the first network 410) and/or share the second frequency spectrum (with the second network 411). In some aspects, the sidelink carriers 470, 480 may operate in an unlicensed/shared radio frequency spectrum.

In some aspects, sidelink communications on a sidelink carrier may occur between the first UE 450 and the second UE 451. In an aspect, the first UE 450 may perform sidelink communications with one or more (for example, multiple) devices, including the second UE 451 via the first sidelink carrier 470. For example, the first UE 450 may transmit a broadcast transmission via the first sidelink carrier 470 to the multiple devices (for example, the second and third UEs 451, 452). The second UE 451 (for example, among other UEs) may receive such broadcast transmission. Additionally or alternatively, the first UE 450 may transmit a multicast transmission via the first sidelink carrier 470 to the multiple devices (for example, the second and third UEs 451, 452).

The second UE 451 and/or the third UE 452 (for example, among other UEs) may receive such multicast transmission. The multicast transmissions may be connectionless or connection-oriented. A multicast transmission may also be referred to as a groupcast transmission.

Furthermore, the first UE 450 may transmit a unicast transmission via the first sidelink carrier 470 to a device, such as the second UE 451. The second UE 451 (for example, among other UEs) may receive such unicast transmission. Additionally or alternatively, the second UE 451 may perform sidelink communications with one or more (for example, multiple) devices, including the first UE 450 via the second sidelink carrier 480. For example, the second UE 451 may transmit a broadcast transmission via the second sidelink carrier 480 to the multiple devices. The first UE 450 (for example, among other UEs) may receive such broadcast transmission.

In another example, the second UE 451 may transmit a multicast transmission via the second sidelink carrier 480 to the multiple devices (for example, the first and third UEs 450, 452). The first UE 450 and/or the third UE 452 (for example, among other UEs) may receive such multicast transmission. Further, the second UE 451 may transmit a unicast transmission via the second sidelink carrier 480 to a device, such as the first UE 450. The first UE 450 (for example, among other UEs) may receive such unicast transmission. The third UE 452 may communicate in a similar manner.

In some aspects, for example, such sidelink communications on a sidelink carrier between the first UE 450 and the second UE 451 may occur without having MNOs allocating resources (for example, one or more portions of a resource block (RB), slot, frequency band, and/or channel associated with a sidelink carrier 470, 480) for such communications and/or without scheduling such communications. Sidelink communications may include traffic communications (for example, data communications, control communications, paging communications and/or system information communications). Further, sidelink communications may include sidelink feedback communications associated with traffic communications (for example, a transmission of feedback information for previously-received traffic communications). Sidelink communications may employ at least one sidelink communications structure having at least one feedback symbol. The feedback symbol of the sidelink communications structure may allot for any sidelink feedback information that may be communicated in the device-to-device (D2D) communications system 400 between devices (for example, a first UE 450, a second UE 451, and/or a third UE 452). As discussed, a UE may be a vehicle (for example, UE 450, 451), a mobile device (for example, 452), or another type of device. In some cases, a UE may be a special UE, such as a roadside unit (RSU).

Figure 5:
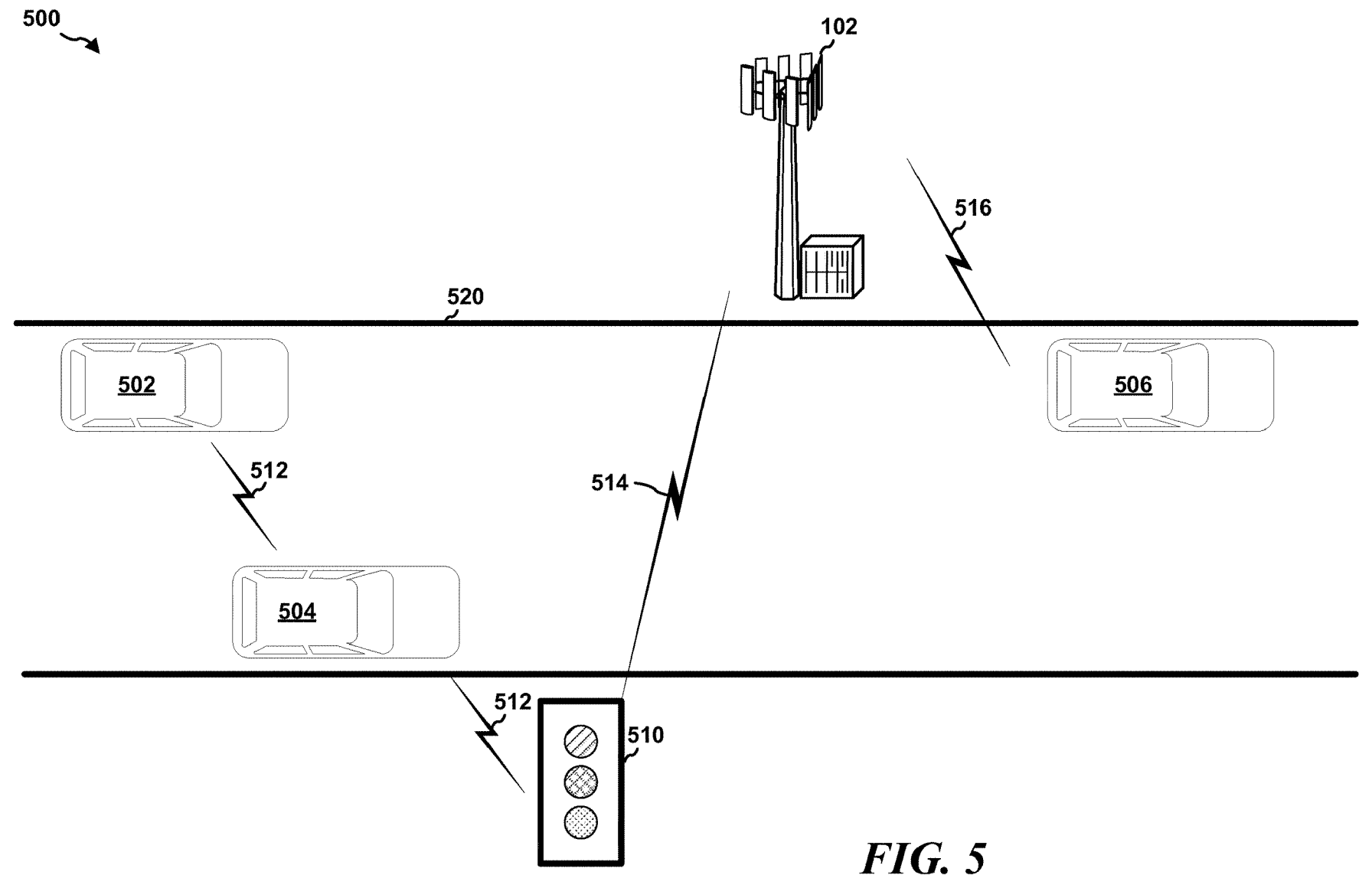

FIG. 5 illustrates an example of a vehicle-to-everything (V2X) system with a roadside unit (RSU), according to aspects of the present disclosure. As shown in FIG. 5, V2X system 500 includes a transmitter UE 504 transmits data to an RSU 510 and a receiving UE 502 via sidelink transmissions 512. The UEs 502, 504, and 506 may be examples of a UE 104 described with reference to FIGS. 1, 2, and 3. Additionally, or alternatively, the RSU 510 may transmit data to the transmitter UE 504 via a sidelink transmission 512. The RSU 510 may forward data received from the transmitter UE 504 to a cellular network base station (for example, gNB) 102 via an UL transmission 514. The gNB 508 may transmit the data received from the RSU 510 to other UEs 506 via a DL transmission 516. The RSU 510 may be incorporated with traffic infrastructure (for example, traffic light, light pole, etc.) For example, as shown in FIG. 5, the RSU 510 is a traffic signal positioned at a side of a road 520. Additionally or alternatively, RSUs 510 may be stand-alone units.

Figure 6:
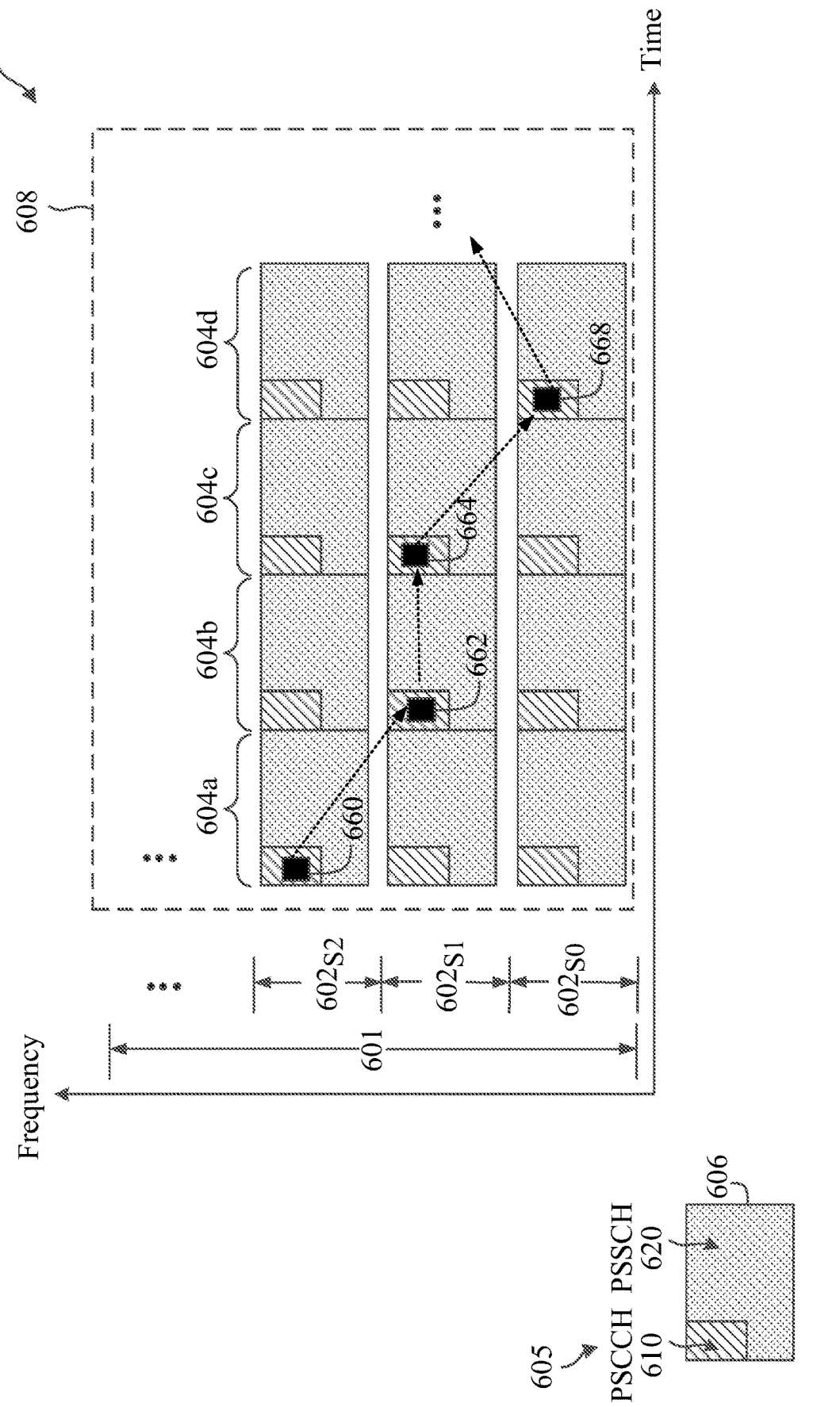
FIG. 6 is a graph illustrating a sidelink (SL) communications scheme, in accordance with various aspects of the present disclosure.

FIG. 6 is a graph illustrating a sidelink (SL) communications scheme, in accordance with various aspects of the present disclosure. A scheme 600 may be employed by UEs such as the UEs 104 in a network such as the network 100. In FIG. 6, the x-axis represents time and the y-axis represents frequency. The CV2X channels may be for 3GPP Release 16 and beyond.

In the scheme 600, a shared radio frequency band 601 is partitioned into multiple subchannels or frequency subbands 602 (shown as 602S0, 602S1, 602S2) in frequency and multiple sidelink frames 604 (shown as 604a, 604b, 604c, 604d) in time for sidelink communications. The frequency band 601 may be at any suitable frequencies. The frequency band 601 may have any suitable bandwidth (BW) and may be partitioned into any suitable number of frequency subbands 602. The number of frequency subbands 602 can be dependent on the sidelink communications BW requirement.

Each sidelink frame 604 includes a sidelink resource 606 in each frequency subband 602. A legend 605 indicates the types of sidelink channels within a sidelink resource 606. In some instances, a frequency gap or guard band may be specified between adjacent frequency subbands 602, for example, to mitigate adjacent band interference. The sidelink resource 606 may have a substantially similar structure as an NR sidelink resource. For instance, the sidelink resource 606 may include a number of subcarriers or RBs in frequency and a number of symbols in time. In some instances, the sidelink resource 606 may have a duration between about one millisecond (ms) to about 20 ms. Each sidelink resource 606 may include a PSCCH 610 and a PSSCH 620. The PSCCH 610 and the PSSCH 620 can be multiplexed in time and/or frequency. The PSCCH 610 may be for part one of a control channel (CCH), with the second part arriving as a part of the shared channel allocation. In the example of FIG. 6, for each sidelink resource 606, the PSCCH 610 is located during the beginning symbol(s) of the sidelink resource 606 and occupies a portion of a corresponding frequency subband 602, and the PSSCH 620 occupies the remaining time-frequency resources in the sidelink resource 606. In some instances, a sidelink resource 606 may also include a physical sidelink feedback channel (PSFCH), for example, located during the ending symbol(s) of the sidelink resource 606. In general, a PSCCH 610, a PSSCH 620, and/or a PSFCH may be multiplexed within a sidelink resource 606.

The PSCCH 610 may carry SCI 660 and/or sidelink data. The sidelink data can be of various forms and types depending on the sidelink application. For instance, when the sidelink application is a V2X application, the sidelink data may carry V2X data (for example, vehicle location information, traveling speed and/or direction, vehicle sensing measurements, etc.). Alternatively, when the sidelink application is an IIoT application, the sidelink data may carry IIoT data (for example, sensor measurements, device measurements, temperature readings, etc.). The PSFCH can be used for carrying feedback information, for example, hybrid automatic repeat request (HARQ) acknowledgment/negative acknowledgment (ACK/NACK) for sidelink data received in an earlier sidelink resource 606.

In an NR sidelink frame structure, the sidelink frames 604 in a resource pool 608 may be contiguous in time. A sidelink UE (for example, the UEs 104) may include, in SCI 660, a reservation for a sidelink resource 606 in a later sidelink frame 604. Thus, another sidelink UE (for example, a UE in the same NR-U sidelink system) may perform SCI sensing in the resource pool 608 to determine whether a sidelink resource 606 is available or occupied. For instance, if the sidelink UE detected SCI indicating a reservation for a sidelink resource 606, the sidelink UE may refrain from transmitting in the reserved sidelink resource 606. If the sidelink UE determines that there is no reservation detected for a sidelink resource 606, the sidelink UE may transmit in the sidelink resource 606. As such, SCI sensing can assist a UE in identifying a target frequency subband 602 to reserve for sidelink communications and to avoid intra-system collision with another sidelink UE in the NR sidelink system. In some aspects, the UE may be configured with a sensing window for SCI sensing or monitoring to reduce intra-system collision.

In some aspects, the sidelink UE may be configured with a frequency hopping pattern. In this regard, the sidelink UE may hop from one frequency subband 602 in one sidelink frame 604 to another frequency subband 602 in another sidelink frame 604. In the illustrated example of FIG. 6, during the sidelink frame 604*a*, the sidelink UE transmits SCI 660 in the sidelink resource 606 located in the frequency subband 602S2 to reserve a sidelink resource 606 in a next sidelink frame 604*b* located at the frequency subband 602S1. Similarly, during the sidelink frame 604*b*, the sidelink UE transmits SCI 662 in the sidelink resource 606 located in the frequency subband 602S1 to reserve a sidelink resource 606 in a next sidelink frame 604*c* located at the frequency subband 602S1. During the sidelink frame 604*c*, the sidelink UE transmits SCI 664 in the sidelink resource 606 located in the frequency subband 602S1 to reserve a sidelink resource 606 in a next sidelink frame 604*d* located at the frequency subband 602S0. During the sidelink frame 604*d*, the sidelink UE transmits SCI 668 in the sidelink resource 606 located in the frequency subband 602S0. The SCI 668 may reserve a sidelink resource 606 in a later sidelink frame 604.

The SCI can also indicate scheduling information and/or a destination identifier (ID) identifying a target receiving sidelink UE for the next sidelink resource 606. Thus, a sidelink UE may monitor for SCI transmitted by other sidelink UEs. Upon detecting SCI in a sidelink resource 606, the sidelink UE may determine whether the sidelink UE is the target receiver based on the destination ID. If the sidelink UE is the target receiver, the sidelink UE may proceed to receive and decode the sidelink data indicated by the SCI. In some aspects, multiple sidelink UEs may simultaneously communicate sidelink data in a sidelink frame 604 in different frequency subband (for example, via frequency division multiplexing (FDM)). For instance, in the sidelink frame 604*b*, one pair of sidelink UEs may communicate sidelink data using a sidelink resource 606 in the frequency subband 602S2 while another pair of sidelink UEs may communicate sidelink data using a sidelink resource 606 in the frequency subband 602S1.

In some aspects, the scheme 600 is used for synchronous sidelink communications. That is, the sidelink UEs may be synchronized in time and are aligned in terms of symbol boundary, sidelink resource boundary (for example, the starting time of sidelink frames 604). The sidelink UEs may perform synchronization in a variety of forms, for example, based on sidelink synchronization signal blocks (SSBs) received from a sidelink UE and/or NR-U SSBs received from a base station (for example, the base station 102) while in-coverage of the base station. In some aspects, the sidelink UE may be preconfigured with the resource pool 608 in the frequency band 601, for example, while in coverage of a serving base station. The resource pool 608 may include a plurality of sidelink resources 606. The base station can configure the sidelink UE with a resource pool configuration indicating resources in the frequency band 601 and/or the subbands 602 and/or timing information associated with the sidelink frames 604. In some aspects, the scheme 600 includes mode-2 RRA (for example, supporting autonomous radio resource allocation (RRA) that can be used for out-of-coverage sidelink UEs or partial-coverage sidelink UEs).

In some wireless communication systems, a UE and a network device may exchange control information via a radio resource control (RRC) message, a non-stratum access layer (NAS) message, or a medium access control (MAC) control element (CE) (MAC-CE). The MAC-CE may be used for MAC layer communications, such as indicating a buffer status report (BSR) or initiating a beam failure recovery (BFR) procedure.

In some examples, a UE may transmit the BSR to the network node in order to receive an uplink resource grant. The BSR may indicate a buffer size for one or more logical channel groups (LCGs). A respective LCG ID for each LCG associated with the buffer size may be included in the BSR. The BSR may be a long BSR or a short BSR. For regular and periodic BSRs, the long BSR may be an example of a BSR that indicates a buffer size for two or more LCGs. Alternatively, the short BSR may be an example of a BSR that indicates a buffer size for only one LCG.

In some examples, the BSR may be an example of a padding BSR if an amount of padding bits in a BSR MAC-CE is greater than or equal to a size of the BSR MAC-CE in combination with a subheader of the BSR MAC-CE. The long BSR may be used if the quantity of padding bits is greater than or equal to a size of the long BSR. In some such examples, if the quantity of the padding bits is greater than or equal to a size of the short BSR and less than the size of the long BSR, the short BSR may be used if the BSR indicates a buffer size for only one LCG. In other such examples, if the BSR indicates a buffer size for two or more LCGs and the quantity of padding bits is equal to the size of the short BSR, the UE may use a short truncated BSR for a LCG associated with a highest priority channel. In still other examples, if the BSR indicates the buffer size for two or more LCGs and the quantity of padding bits is greater than the size of the short BSR, the UE may use a long truncated BSR for LCGs associated with the highest priority channels.

In some examples, the UE transmits the MAC-CE to the network node via an uplink shared channel (for example, physical uplink shared channel (PUSCH)). In some such examples, a size of the entire MAC-CE may be greater than an amount of available uplink shared channel resources. In such examples, the UE may truncate the MAC-CE based on one or more pre-defined rules (for example, pre-defined in a wireless standard). Truncating a BSR based on a logical channel priority is an example of a rule for truncating the MAC-CE. The truncated MAC-CE may then be transmitted via the available uplink shared channel resources. The truncated MAC-CE may be an example of a truncated BSR MAC-CE, a truncated SL BSR MAC-CE, or a truncated BFR MAC-CE.

As discussed, the UE may truncate the MAC-CE based on one or more pre-defined rules. It may be desirable to dynamically indicate a payload of the MAC-CE (for example, truncated MAC-CE) when the UE cannot transmit the entire MAC-CE due to a limited availability of uplink shared channel resources. Various aspects of the present disclosure are directed to a network node indicating an update to an existing MAC-CE assembly procedure to dynamically change one or both of a BSR priority or a MAC-CE threshold size. The update to the BSR priority assigns a highest priority to a specific BSR. In some examples, the highest priority BSR is included in a truncated MAC-CE.

Figure 7:
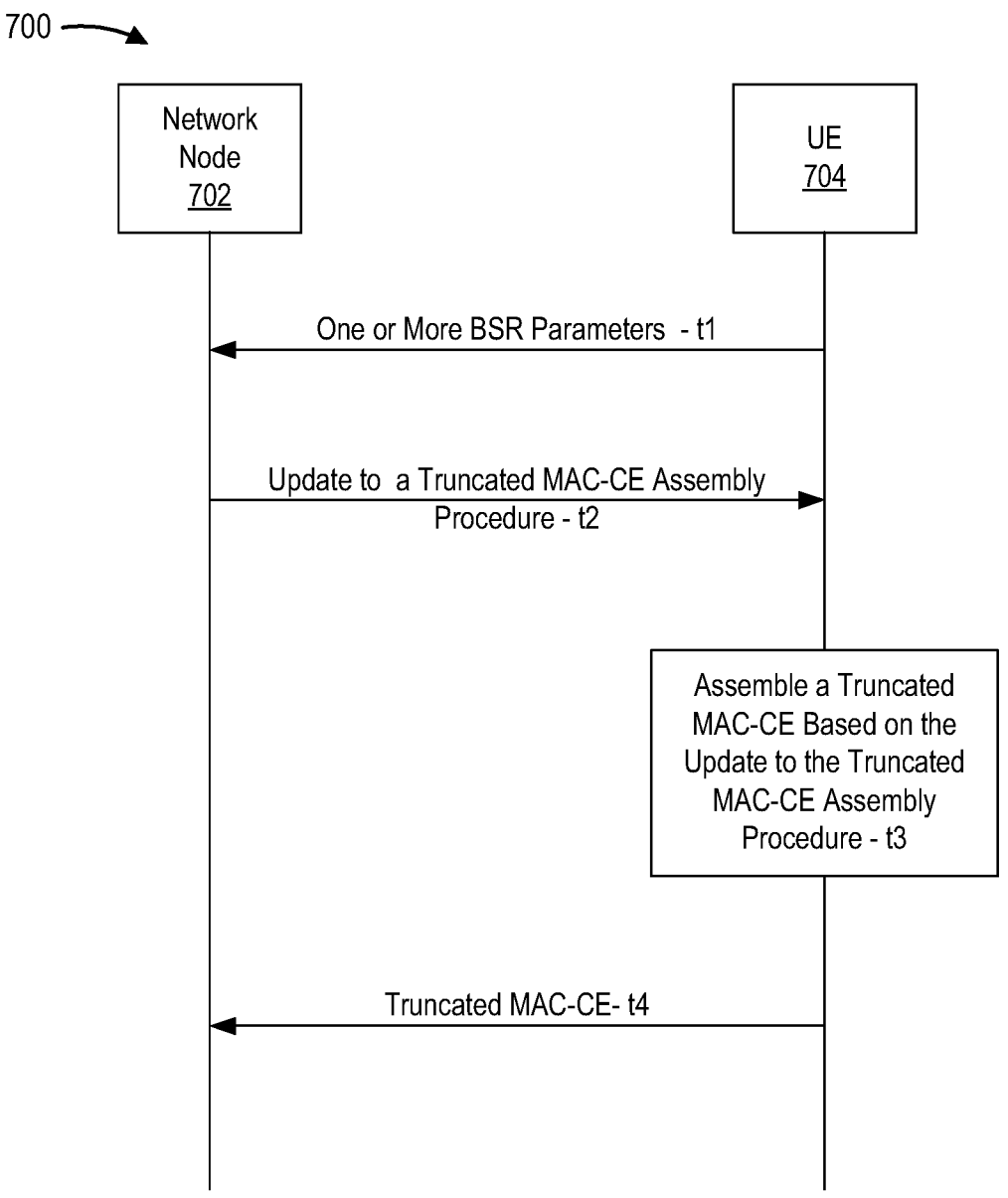
FIG. 7 is a timing diagram illustrating an example of a network node updating an existing medium access control (MAC) control element (CE) (MAC-CE) assembly procedure of a UE, in accordance with various aspects of the present disclosure.

FIG. 7 is a timing diagram illustrating an example 700 of a network node 702 updating an existing MAC-CE assembly procedure of a UE 704, in accordance with various aspects of the present disclosure. The network node 702 may be an example of a base station 102 as described with reference to FIG. 1, a CU 310, DU 330, or RU 340 as described with reference to FIG. 3, or a base station 420 or 421 as described with reference to FIG. 4. The UE 704 may be an example of a UE 104 as described with reference to FIGS. 1, 2, and 3, a UE 450, 451, or 452 as described with reference to FIG. 4, or a UE 502, 504, or 506 as described with reference to FIG. 5. As shown in FIG. 7, at time t1, the UE 704 may transmit, to the network node 702, a message indicating one or more BSR parameters. The message transmitted at time t1 may be a MAC-CE. Additionally, the one or more BSR parameters may be an example of coarse information. At time t2, the UE 704 may receive a message indicating an update to a current MAC-CE assembly procedure of the UE 704. The message may be received via downlink control information (DCI) or an RRC message. The current MAC-CE assembly procedure may also be referred to as an existing MAC-CE assembly procedure. The update may modify one or both of a BSR priority for a type of BSR included in the MAC-CE or a MAC-CE threshold size associated with the current MAC-CE assembly procedure. The BSR priority may be an example of a priority associated with one or more BSRs. In some examples, the UE 704 selects the highest priority BSR(s) when assembling a truncated MAC-CE. As discussed, the UE 704 may truncate the MAC-CE because a size of the MAC-CE may be greater than a quantity of resources allocated for the MAC-CE in the uplink shared channel.

In some examples, the message is received, at time t2, based on transmitting the one or more BSR parameters at time t1. In such examples, the update indicated via the message may be based on the one or more BSR parameters. In some examples, the one or more BSR parameters may include a respective ID of each LCG associated with current network traffic (for example, each LCG that includes network traffic). In such examples, the update may change the BSR priority to assign a highest priority to each BSR associated with a respective LCG that includes network traffic. In other examples, the one or more BSR parameters may include a respective buffer size (for example, a one-bit buffer size) for one or more LCGs. The one-bit buffer size may indicate whether the respective buffer size is greater than or less than a threshold size, such as one megabyte. In such examples, the update may change the BSR priority to assign the highest priority to each BSR with a buffer size that is greater than or less than the threshold size. In some such examples, the UE 704 may report a multi-bit buffer size for the respective LCG associated with each BSR transmitted based on receiving the message (time t2). The multi-bit buffer size may provide more details about the buffer size in comparison to the one-bit buffer size.

In other examples, the network node 702 independently transmits the message. In some such examples, the UE 704 may not transmit the one or more BSR parameters at time t1. In other such examples, the UE 704 may transmit the one or more BSR parameters at time t1. In some examples, the update changes the BSR priority to assign the highest priority to one or more BSRs associated with a set of BSR attributes, such as one or more of a BSR type, a BSR size, or a BSR format. In such examples, the message may also indicate the set of BSR attributes. In some other examples, the update changes the BSR priority to assign the highest priority to one or more BSRs associated with one or more LCGs from a group of LCGs. In such examples, the message indicates the one or more LCGs. In some other examples, the update changes the BSR priority to remove a priority associated with one or more BSRs. In such examples, the UE 704 does not include the BSR in the MAC-CE and resources allocated for the BSR, or the MAC-CE, in the uplink shared channel may be used for UE data. Additionally, or alternatively, the update modifies the MAC-CE threshold size to be equal to one of a quantity of bits or a proportion of a total quantity of bits available to the MAC-CE in the TB. The message may also indicate the quantity of bits or the proportion of the total quantity of bits available to the MAC-CE in the TB.

At time t3, the UE 704 assembles the truncated MAC-CE based on the update to the current truncated MAC-CE assembly procedure. As discussed, the UE 704 may truncate the MAC-CE when the size of the MAC-CE is greater than a quantity of resources allocated to the MAC-CE in the uplink shared channel. In such examples, when assembling the truncated MAC-CE, the UE 704 may include one or more BSRs in the truncated MAC-CE based on the update to the BSR priority indicated in the message. At time t4, the UE 704 transmits the truncated MAC-CE to the network node 702 via a TB.

In some examples, the update to the MAC-CE assembly procedure may be valid for a time period. In some such examples, the time period may be a quantity of slots, such that the UE 704 may be limited to assembling the MAC-CE based on the update to the current MAC-CE assembly procedure during a period of time associated with the slots. In other such examples, the time period may be a period of time until a subsequent MAC-CE assembly procedure is received. In such examples, the UE 704 may be limited to assembling the MAC-CE based on the update to the current MAC-CE assembly procedure until the UE 704 receives the subsequent message. Each message may indicate the time period for applying the update.

The example 700 of FIG. 7 illustrates an example of an explicit indication via a message. In some examples, the indication of the update to one or both of a BSR priority for a type of BSR included in the MAC-CE or a MAC-CE threshold size may be implicitly indicated via DCI, such as a DCI grant. In some such examples, the MAC-CE threshold size may be implicitly indicated based on a total amount of uplink shared channel resources granted via the DCI grant. The UE 704 may be configured with a rule indicating that the MAC-CE threshold size is equal to or less than a proportion, such as fifteen percent, of a total amount of allocated uplink channel resources if the total amount of allocated uplink channel resources satisfies one or more conditions. The one or more conditions may be satisfied based on the total amount of allocated uplink channel resources being less than a resource threshold.

In some examples, the MAC-CE may be an SL MAC-CE. In such examples, the message may be an SL message that is received via an SL resource grant, SL control information (SCI), or an SL RRC message. The indication of the update may be implicit via the SL resource grant or explicit via the SCI. As discussed, the implicit indication may be based on a rule configured at the UE 704. In some examples, the configured rule may indicate that the MAC-CE threshold size may be equal to or less than a proportion of physical SL shared channel (PSSCH) resources granted via the SL resource grant if a total amount of allocated PSSCH resources satisfies one or more conditions. In some such examples, the one or more conditions may be satisfied if the total amount of allocated PSSCH resources is less than a resource threshold. In some examples, the update to the SL MAC-CE assembly procedure may be valid for a time period. As discussed, the time period may be for a certain amount of slots or frames, or until a triggering event (for example, receiving a subsequent SL message).

Figure 8:
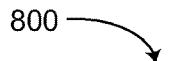
FIG. 8 is a block diagram illustrating an example wireless communication device that supports updating a truncated MAC-CE assembly procedure, in accordance with various aspects of the present disclosure.

FIG. 8 is a block diagram illustrating an example wireless communication device 800 that supports dynamically configuring a MAC-CE assembly procedure, in accordance with some aspects of the present disclosure. The device 800 may be an example of aspects of a UE 704 described with reference to FIG. 7. The wireless communication device 800 may include a receiver 810, a communications manager 808, a transmitter 820, a MAC-CE configuration component 830, and a MAC-CE assembly component 840, which may be in communication with one another (for example, via one or more buses). In some examples, the wireless communication device 800 is configured to perform operations, including operations of the process 900 described below with reference to FIG. 9.

In some examples, the wireless communication device 800 can include a chip, chipset, package, or device that includes at least one processor and at least one modem (for example, a 5G modem or other cellular modem). In some examples, the communications manager 808, or its subcomponents, may be separate and distinct components. In some examples, at least some components of the communications manager 808 are implemented at least in part as software stored in a memory. For example, portions of one or more of the components of the communications manager 808 can be implemented as non-transitory code executable by the processor to perform the functions or operations of the respective component.

The receiver 810 may receive one or more of reference signals (for example, periodically configured channel state information reference signals (CSI-RSs), aperiodically configured CSI-RSs, or multi-beam-specific reference signals), synchronization signals (for example, synchronization signal blocks (SSBs)), control information and data information, such as in the form of packets, from one or more other wireless communication devices via various channels including control channels (for example, a physical downlink control channel (PDCCH), physical uplink control channel (PUCCH), or physical sidelink control channel PSCCH) and data channels (for example, a physical downlink shared channel (PDSCH), PSSCH, a physical uplink shared channel (PUSCH)). The other wireless communication devices may include, but are not limited to, a network node 702 described with reference to FIG. 7.

The received information may be passed on to other components of the device 800. The receiver 810 may be an example of aspects of the receive processor 256 described with reference to FIG. 2. The receiver 810 may include a set of radio frequency (RF) chains that are coupled with or otherwise utilize a set of antennas (for example, the set of antennas may be an example of aspects of the antennas 252 described with reference to FIG. 2).

The transmitter 820 may transmit signals generated by the communications manager 808 or other components of the wireless communication device 800. In some examples, the transmitter 820 may be collocated with the receiver 810 in a transceiver. The transmitter 820 may be an example of aspects of the transmit processor 268 described with reference to FIG. 2. The transmitter 820 may be coupled with or otherwise utilize a set of antennas (for example, the set of antennas may be an example of aspects of the antennas 252 described with reference to FIG. 2), which may be antenna elements shared with the receiver 810. In some examples, the transmitter 820 is configured to transmit control information in a PUCCH, PSCCH, or PDCCH and data in a physical uplink shared channel (PUSCH), PSSCH, or PDSCH.

The communications manager 808 may be an example of aspects of the controller/processor 259 described with reference to FIG. 2. The communications manager 808 may include the MAC-CE configuration component 830 and the MAC-CE assembly component 840. In some examples, working with the receiver 810, the MAC-CE configuration component 830 receives, from a network node, a message indicating an update to a current truncated MAC-CE assembly procedure at the UE. The update may include one or both of a change in a BSR priority assigned to one or more BSRs associated with one or more LCGs of a group of LCGs or a change in a MAC-CE threshold size. Additionally, working in conjunction with the MAC-CE configuration component 830, the MAC-CE assembly component 840 may assemble a truncated MAC-CE based on the update to the current truncated MAC-CE assembly procedure. Working in conjunction with the MAC-CE assembly component 840, the transmitter 820 may transmit, to the network node via a TB, the truncated MAC-CE.

FIG. 9 is a flow diagram illustrating an example process 900 performed by a UE, in accordance with some aspects of the present disclosure. The UE may be an example of a UE 704 described with reference to FIG. 7. The example process 900 is an example of dynamically configuring a MAC-CE assembly procedure. As shown in FIG. 9, the process 900 begins at block 902 by receiving, from a network node, a message indicating an update to a current truncated MAC-CE assembly procedure at the UE. The update may include one or both of a change in a BSR priority assigned to one or more BSRs associated with one or more LCGs of a group of LCGs or a change in a MAC-CE threshold size. At block 904, the process 900 assembles a truncated MAC-CE based on the update to the current truncated MAC-CE assembly procedure. At block 906, the process 900 transmits, to the network node via a TB, the truncated MAC-CE.

Figure 10:
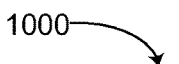
FIG. 10 is a block diagram illustrating an example wireless communication device that supports updating a truncated MAC-CE assembly procedure, in accordance with aspects of the present disclosure

FIG. 10 is a block diagram illustrating an example wireless communication device 1000 that supports updating a truncated MAC-CE assembly procedure, in accordance with aspects of the present disclosure. The wireless communication device 1000 may be an example of a network node 702 described with reference to FIG. 7. The wireless communication device 1000 may include a receiver 1010, a communications manager 1015, a BSR parameter component 1030, a MAC-CE configuration component 1040, and a transmitter 1020, which may be in communication with one another (for example, via one or more buses). In some examples, the wireless communication device 1000 is configured to perform operations, including operations of the process 1100 described below with reference to FIG. 11.

In some examples, the wireless communication device 1000 can include a chip, system on chip (SOC), chipset, package, or device that includes at least one processor and at least one modem (for example, a 5G modem or other cellular modem). In some examples, the communications manager 1015, or its sub-components, may be separate and distinct components. In some examples, at least some components of the communications manager 1015 are implemented at least in part as software stored in a memory. For example, portions of one or more of the components of the communications manager 1015 can be implemented as non-transitory code executable by the processor to perform the functions or operations of the respective component.

The receiver 1010 may receive one or more reference signals (for example, periodically configured CSI-RSs, aperiodically configured CSI-RSs, or multi-beam-specific reference signals), synchronization signals (for example, synchronization signal blocks (SSBs)), control information, and/or data information, such as in the form of packets, from one or more other wireless communication devices via various channels including control channels (for example, a PUCCH or a PSCCH) and data channels (for example, a PUSCH or a PSSCH). The other wireless communication devices may include, but are not limited to, a UE 104, described with reference to FIGS. 1, 3, and 5, or a UE 704 described with reference to FIG. 7.

The received information may be passed on to other components of the wireless communication device 1000. The receiver 1010 may be an example of aspects of the receive processor 270 described with reference to FIG. 2. The receiver 1010 may include a set of radio frequency (RF) chains that are coupled with or otherwise utilize a set of antennas (for example, the set of antennas may be an example of aspects of the antennas 234 described with reference to FIG. 2).

The transmitter 1020 may transmit signals generated by the communications manager 1015 or other components of the wireless communication device 1000. In some examples, the transmitter 1020 may be collocated with the receiver 1010 in a transceiver. The transmitter 1020 may be an example of aspects of the transmit processor 216 described with reference to FIG. 2. The transmitter 1020 may be coupled with or otherwise utilize a set of antennas (for example, the set of antennas may be an example of aspects of the antennas 252), which may be antenna elements shared with the receiver 1010. In some examples, the transmitter 1020 is configured to transmit control information in a PDCCH or a PSCCH and data in a PDSCH or PSSCH.

The communications manager 1015 may be an example of aspects of the controller/processor 275 described with reference to FIG. 2. The communications manager 1015 includes the BSR parameter component 1030 and the MAC-CE configuration component 1040. In some examples, working in conjunction with the receiver 1010, the BSR parameter component 1030 receives, from a UE, a first message indicating one or more BSR parameters. Furthermore, working in conjunction with the transmitter 1020, the MAC-CE configuration component 1040 transmits a second message indicating an update to a current truncated MAC-CE assembly procedure of the UE based on receiving the first message. The update may include one or both of a change in a BSR priority assigned to one or more BSRs associated with one or more LCGs of a group of LCGs or a change in a MAC-CE threshold size. Furthermore, working in conjunction with the receiver 1010, the communications manager 1015 receives, from the UE, a TB including a truncated MAC-CE. The truncated MAC-CE may be assembled at the UE based on the update to the current MAC-CE assembly procedure.

FIG. 11 is a flow diagram illustrating an example of a process 1100 performed by a wireless device, in accordance with some aspects of the present disclosure. The wireless device may be an example of a network node 702 described with reference to FIG. 7. The example process 1100 is an example of configuring a MAC-CE assembly procedure. As shown in FIG. 11, the process 1100 begins at block 1102, by receiving, from a UE, a first message indicating one or more BSR parameters. At block 1104, the process 1100 transmits a second message indicating an update to a current truncated MAC-CE assembly procedure of the UE based on receiving the first message. The update may include one or both of a change in a BSR priority assigned to one or more BSRs associated with one or more LCGs of a group of LCGs or a change in a MAC-CE threshold size. At block 1106, the process 1100 receives, from the UE, a TB including a truncated MAC-CE. The truncated MAC-CE may be assembled at the UE based on the update to the current MAC-CE assembly procedure.

Implementation examples are described in the following numbered clauses:

Clause 1. A method for wireless communication by a UE, comprising: receiving, from a network node, a message indicating an update to a current truncated MAC-CE assembly procedure at the UE, the update including one or both of a change in a BSR priority assigned to one or more BSRs associated with one or more LCGs of a group of LCGs or a change in a MAC-CE threshold size; assembling a truncated MAC-CE based on the update to the current truncated MAC-CE assembly procedure; and transmitting, to the network node via a TB, the truncated MAC-CE.

Clause 2. The method of Clause 1, further comprising modifying, based on the update, the BSR priority to assign a highest priority to each BSR of the one or more BSRs associated with a set of BSR attributes including one or more of a BSR type, a BSR size, or a BSR format, wherein: the message further indicates the set of BSR attributes; and the truncated MAC-CE includes each BSR associated with the highest priority.

Clause 3. The method of Clause 1, further comprising modifying, based on the update, the BSR priority to assign a highest priority to the one or more BSRs, wherein: the message further indicates the one or more LCGs of the group of LCGs; and the truncated MAC-CE includes the one or more BSRs associated with the highest priority.

Clause 4. The method of Clause 1, further comprising modifying, based on the update, the BSR priority to remove a priority associated with the one or more BSRs, wherein the truncated MAC-CE does not include the one or more BSRs.

Clause 5. The method of any one of Clauses 1-4, further comprising modifying, based on the update, the MAC-CE threshold size to be equal to one of a quantity of bits or a proportion of a total quantity of bits available to the truncated MAC-CE in the TB, wherein: the message further indicates the quantity of bits or the proportion of the total quantity of bits available to the truncated MAC-CE in the TB; and a size of the truncated MAC-CE is equal to or less than the modified MAC-CE threshold size.

Clause 6. The method of any one of Clauses 1-5, wherein the message is received via DCI or an RRC message.

Clause 7. The method of any one of Clauses 1-6, wherein: the message further indicates a time period associated with the update; the update is valid during the time period; and the truncated MAC-CE is assembled based on the current truncated MAC-CE assembly procedure upon expiration of the time period.

Clause 8. The method of any one of Clauses 1-7, further comprising transmitting, to the network node, a BSR parameter message indicating one or more BSR parameters, wherein the message is received based on transmitting the BSR parameter message.

Clause 9. The method of Clause 8, wherein the one or more BSR parameters include one or more of a respective identifier of each LCG associated with current network traffic or a buffer report including one or more single-bit buffer size fields.

Clause 10. The method of any one of Clauses 1-9, wherein the truncated MAC-CE is a SL MAC-CE.

Clause 11. The method of Clause 10, wherein the message is received via a SL resource grant, SCI, or a SL RRC message.

Clause 12. A method for wireless communication by a network node, comprising: receiving, from a UE, a first message indicating one or more BSR parameters; transmitting a second message indicating an update to a current truncated MAC-CE assembly procedure of the UE based on receiving the first message, the update including one or both of a change in a BSR priority assigned to one or more BSRs associated with one or more LCGs of a group of LCGs or a change in a MAC-CE threshold size; and receiving, from the UE, a TB including a truncated MAC-CE, the truncated MAC-CE being assembled at the UE based on the update to the current MAC-CE assembly procedure.

Clause 13. The method of Clause 12, wherein: the second message further indicates a set of BSR attributes including one or more a BSR type, a BSR size, or a BSR format; the change in the BSR priority assigns a highest priority to each BSR of the one or more BSRs associated with the set of BSR attributes; and the truncated MAC-CE includes each BSR associated with the highest priority.

Clause 14. The method of Clause 12, wherein: the second message further indicates the one or more LCGs; the change in the BSR priority assigns a highest priority to the one or more BSRs; and the truncated MAC-CE includes the one or more BSRs associated with the highest priority.

Clause 15. The method of Clause 12, wherein: the change in the BSR priority removes a priority associated with the one or more BSRs; and the truncated MAC-CE does not include the one or more BSRs.

Clause 16. The method of any one of Clauses 12-15, wherein: the second message further indicates a quantity of bits or a proportion of a total quantity of bits available to the truncated MAC-CE in the TB; the update changes the MAC-CE threshold size to be equal to the quantity of bits or the proportion of the total quantity of bits available to the truncated MAC-CE in the TB; and a size of the truncated MAC-CE is equal to or less than the MAC-CE threshold size.

Clause 17. The method of any one of Clauses 12-16, wherein the second message is transmitted via DCI or an RRC message.

Clause 18. The method of any one of Clauses 12-17, wherein: the second message further indicates a time period associated with the update; the update is valid during the time period; and the truncated MAC-CE is assembled based on the current truncated MAC-CE assembly procedure upon expiration of the time period.

Clause 19. The method of any one of Clauses 12-18, wherein the one or more BSR parameters include one or more of a respective identifier of each LCG associated with current network traffic or one or more single-bit buffer size fields.

Clause 20. The method of any one of Clauses 12-19, wherein the truncated MAC-CE is a SL MAC-CE.

Clause 21. The method of Clause 20, wherein the second message is transmitted via a SL resource grant, SCI, or a SL RRC message.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (for example, related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method for wireless communication by a user equipment (UE), comprising:

transmitting, to a network node, a medium access control (MAC) control element (CE) (MAC-CE) message indicating: one or more buffer status report (BSR) parameters and a quantity of bits or a proportion of a total quantity of bits available to a truncated MAC-CE in a transport block (TB), the one or more BSR parameters include one or more of a respective identifier of each logical channel group (LCG), of a group of LCGs, associated with current network traffic or one or more single-bit buffer size fields, each single-bit buffer size field of the one or more single-bit buffer size fields indicating whether a buffer size of a respective LCG of the group of LCGs is greater than or less than a non-zero size threshold, the single-bit buffer size having a first value in accordance with the buffer size being greater than the non-zero size threshold, the single-bit buffer size having a second value in accordance with the buffer size being less than the non-zero size threshold;

receiving, from the network node in accordance with transmitting the MAC-CE message, a message indicating an update to a current truncated MAC-CE assembly procedure at the UE, the update including one or both of a change in a BSR priority assigned to one or more BSRs associated with one or more LCGs of the group of LCGs or a change in a size constraint of a MAC-CE, the one or more BSRs being included in the truncated MAC-CE in accordance with the BSR priority;

modifying, based on the update, the size constraint of the MAC-CE to be equal to one of the quantity of bits or the proportion of the total quantity of bits available to the truncated MAC-CE in the TB, a size of the truncated MAC-CE being equal to or less than the modified size constraint of the MAC-CE;

assembling the truncated MAC-CE based on the update to the current truncated MAC-CE assembly procedure; and transmitting, to the network node via the TB, the truncated MAC-CE.

2. The method of claim 1, further comprising modifying, based on the update, the BSR priority to assign a highest priority to each BSR of the one or more BSRs associated with a set of BSR attributes including one or more of a BSR type, a BSR size, or a BSR format, wherein:

the message further indicates the set of BSR attributes; and the truncated MAC-CE includes each BSR associated with the highest priority.

3. The method of claim 1, further comprising modifying, based on the update, the BSR priority to assign a highest priority to the one or more BSRs, wherein:

the message further indicates the one or more LCGs of the group of LCGs; and the truncated MAC-CE includes the one or more BSRs associated with the highest priority.

4. The method of claim 1, further comprising modifying, based on the update, the BSR priority to remove a priority associated with the one or more BSRs, wherein the truncated MAC-CE does not include the one or more BSRs.

5. The method of claim 1, wherein the message is received via downlink control information (DCI) or a radio resource control (RRC) message.

6. The method of claim 1, wherein the truncated MAC-CE is a sidelink (SL) MAC-CE.

7. The method of claim 6, wherein the message is received via a SL resource grant, SL control information (SCI), or a SL radio resource control (RRC) message.

8. A method for wireless communication by a user equipment (UE), comprising:

transmitting, to a network node, a medium access control (MAC) control element (CE) (MAC-CE) message indicating: one or more buffer status report (BSR) parameters and a time period associated with the update, the one or more BSR parameters include one or more of a respective identifier of each logical channel group (LCG), of a group of LCGs, associated with current network traffic or one or more single-bit buffer size fields, each single-bit buffer size field of the one or more single-bit buffer size fields indicating whether a buffer size of a respective LCG of the group of LCGs is greater than or less than a non-zero size threshold, the single-bit buffer size having a first value in accordance with the buffer size being greater than the non-zero size threshold, the single-bit buffer size having a second value in accordance with the buffer size being less than the non-zero size threshold;

receiving, from the network node in accordance with transmitting the MAC-CE message, a message indicating an update to a current truncated MAC-CE assembly procedure at the UE, the update including one or both of a change in a BSR priority assigned to one or more BSRs associated with one or more LCGs of the group of LCGs or a change in a size constraint of a MAC-CE, the one or more BSRs being included in a truncated MAC-CE in accordance with the BSR priority, the update being valid during the time period;

assembling the truncated MAC-CE based on the update to the current truncated MAC-CE assembly procedure, the truncated MAC-CE being assembled based on the current truncated MAC-CE assembly procedure upon expiration of the time period; and transmitting, to the network node via a transport block (TB), the truncated MAC-CE.

9. An apparatus for wireless communications at a user equipment (UE), comprising:

at least one processor; and at least one memory coupled with the at least one processor and storing instructions operable, when executed by the at least one processor, to cause the apparatus to:

transmit, to a network node, a medium access control (MAC) control element (CE) (MAC-CE) message indicating: one or more buffer status report (BSR) parameters and a quantity of bits or a proportion of a total quantity of bits available to a truncated MAC-CE in a transport block (TB), the one or more BSR parameters include one or more of a respective identifier of each logical channel group (LCG), of a group of LCGs, associated with current network traffic or one or more single-bit buffer size fields, each single-bit buffer size field of the one or more single-bit buffer size fields indicating whether a buffer size of a respective LCG of the group of LCGs is greater than or less than a non-zero size threshold, the single-bit buffer size having a first value in accordance with the buffer size being greater than the non-zero size threshold, the single-bit buffer size having a second value in accordance with the buffer size being less than the non-zero size threshold;

receive, from the network node in accordance with transmitting the MAC-CE message, a message indicating an update to a current truncated MAC-CE assembly procedure at the UE, the update including one or both of a change in a BSR priority assigned to one or more BSRs associated with one or more LCGs of the group of LCGs or a change in a size constraint of a MAC-CE, the one or more BSRs being in the truncated MAC-CE in accordance with the BSR priority;

modify, based on the update, the size constraint of the MAC-CE to be equal to one of the quantity of bits or the proportion of the total quantity of bits available to the truncated MAC-CE in the TB, a size of the truncated MAC-CE being equal to or less than the modified size constraint of the MAC-CE;

assemble the truncated MAC-CE based on the update to the current truncated MAC-CE assembly procedure; and transmit, to the network node via the TB, the truncated MAC-CE.

10. The apparatus of claim 9, wherein execution of the instructions further cause the apparatus to modify, based on the update, the BSR priority to assign a highest priority to each BSR of the one or more BSRs associated with a set of BSR attributes including one or more of a BSR type, a BSR size, or a BSR format, wherein:

the message further indicates the set of BSR attributes; and the truncated MAC-CE includes each BSR associated with the highest priority.

11. The apparatus of claim 9, wherein execution of the instructions further cause the apparatus to modify, based on the update, the BSR priority to assign a highest priority to the one or more BSRs, wherein:

the message further indicates the one or more LCGs of the group of LCGs; and the truncated MAC-CE includes the one or more BSRs associated with the highest priority.

12. The apparatus of claim 9, wherein execution of the instructions further cause the apparatus to modify, based on the update, the BSR priority to remove a priority associated with the one or more BSRs, wherein the truncated MAC-CE does not include the one or more BSRs.

13. A method for wireless communication by a network node, comprising:

receiving, from a user equipment (UE), a first message indicating: one or more buffer status report (BSR) parameters and a quantity of bits or a proportion of a total quantity of bits available to a truncated medium access control (MAC) control element (CE) (MAC-CE) in a transport block (TB), the one or more BSR parameters include one or more of a respective identifier of each logical channel group (LCG) of a group of LCGs associated with current network traffic or one or more single-bit buffer size fields, each single-bit buffer size field of the one or more single-bit buffer size fields indicating whether a buffer size of a respective LCG of the group of LCGs is greater than or less than a non-zero size threshold, the single-bit buffer size having a first value in accordance with the buffer size being greater than the non-zero size threshold, the single-bit buffer size having a second value in accordance with the buffer size being less than the non-zero size threshold;

transmitting a second message indicating an update to a current truncated MAC-CE assembly procedure of the UE in accordance with receiving the first message, the update including one or both of a change in a BSR priority assigned to one or more BSRs associated with one or more LCGs of the group of LCGs or a change in a size constraint of a MAC-CE, the one or more BSRs being included in a truncated MAC-CE in accordance with the BSR priority, the update changing the size constraint of the MAC-CE to be equal to the quantity of bits or the proportion of the total quantity of bits available to the truncated MAC-CE in the TB, a size of the truncated MAC-CE being equal to or less than the size constraint of the MAC-CE; and receiving, from the UE, the TB including the truncated MAC-CE, the truncated MAC-CE being assembled at the UE based on the update to the current MAC-CE assembly procedure.

14. The method of claim 13, wherein:

the second message further indicates a set of BSR attributes including one or more a BSR type, a BSR size, or a BSR format;

the change in the BSR priority assigns a highest priority to each BSR of the one or more BSRs associated with the set of BSR attributes; and the truncated MAC-CE includes each BSR associated with the highest priority.

15. The method of claim 13, wherein:

the second message further indicates the one or more LCGs;

the change in the BSR priority assigns a highest priority to one or more BSRs associated with the one or more LCGs; and the truncated MAC-CE includes the one or more BSRs associated with the highest priority.

16. The method of claim 13, wherein:

the change in the BSR priority removes a priority associated with one or more BSRs; and the truncated MAC-CE does not include the one or more BSRs.

17. The method of claim 13, wherein the second message is transmitted via downlink control information (DCI) or a radio resource control (RRC) message.

18. The method of claim 13, wherein the truncated MAC-CE is a sidelink (SL) MAC-CE.

19. The method of claim 18, wherein the second message is transmitted via a SL resource grant, SL control information (SCI), or a SL radio resource control (RRC) message.

20. The method of claim 13, wherein the first message is a MAC-CE message.

21. A method for wireless communication by a network node, comprising:

receiving, from a user equipment (UE), a first message indicating one or more buffer status report (BSR) parameters, the one or more BSR parameters include one or more of a respective identifier of each logical channel group (LCG) of a group of LCGs associated with current network traffic or one or more single-bit buffer size fields, each single-bit buffer size field of the one or more single-bit buffer size fields indicating whether a buffer size of a respective LCG of the group of LCGs is greater than or less than a non-zero size threshold, the single-bit buffer size having a first value in accordance with the buffer size being greater than the non-zero size threshold, the single-bit buffer size having a second value in accordance with the buffer size being less than the non-zero size threshold;

transmitting a second message indicating: an update to a current truncated medium access control (MAC) control element (CE) (MAC-CE) assembly procedure of the UE in accordance with receiving the first message and a time period associated with the update, the update including one or both of a change in a BSR priority assigned to one or more BSRs associated with one or more LCGs of the group of LCGs or a change in a size constraint of a MAC-CE, the one or more BSRs being included in a truncated MAC-CE in accordance with the BSR priority, the update being valid during the time period; and receiving, from the UE, a transport block (TB) including the truncated MAC-CE, the truncated MAC-CE being assembled at the UE based on the update to the current MAC-CE assembly procedure, the truncated MAC-CE being assembled based on the current truncated MAC-CE assembly procedure upon expiration of the time period.

22. An apparatus for wireless communications at a network node, comprising:

at least one processor; and at least one memory coupled with the at least one processor and storing instructions operable, when executed by the at least one processor, to cause the apparatus to:

receive, from a user equipment (UE), a first message indicating; one or more buffer status report (BSR) parameters and a quantity of bits or a proportion of a total quantity of bits available to a truncated medium access control (MAC) control element (CE) (MAC-CE) in a transport block (TB), the one or more BSR parameters include one or more of a respective identifier of each logical channel group (LCG) of a group of LCGs associated with current network traffic or one or more single-bit buffer size fields, each single-bit buffer size field of the one or more single-bit buffer size fields indicating whether a buffer size of a respective LCG of the group of LCGs is greater than or less than a non-zero size threshold, the single-bit buffer size having a first value in accordance with the buffer size being greater than the non-zero size threshold, the single-bit buffer size having a second value in accordance with the buffer size being less than the non-zero size threshold;

transmit a second message indicating an update to a current truncated MAC-CE assembly procedure of the UE based on receiving the first message, the update including one or both of a change in a BSR priority assigned to one or more BSRs associated with one or more LCGs of the group of LCGs or a change in a size constraint of a MAC-CE, the one or more BSRs being included in a truncated MAC-CE in accordance with the BSR priority, the update changing the size constraint of the MAC-CE to be equal to the quantity of bits or the proportion of the total quantity of bits available to the truncated MAC-CE in the TB, a size of the truncated MAC-CE being equal to or less than the size constraint of the MAC-CE; and receive, from the UE, the TB including the truncated MAC-CE, the truncated MAC-CE being assembled at the UE based on the update to the current MAC-CE assembly procedure.

23. The apparatus of claim 22, wherein:

the second message further indicates a set of BSR attributes including one or more a BSR type, a BSR size, or a BSR format;

the change in the BSR priority assigns a highest priority to each BSR of the one or more BSRs associated with the set of BSR attributes; and the truncated MAC-CE includes each BSR associated with the highest priority.

24. The apparatus of claim 22, wherein:

the second message further indicates the one or more LCGs;

the change in the BSR priority assigns a highest priority to one or more BSRs associated with the one or more LCGs; and the truncated MAC-CE includes the one or more BSRs associated with the highest priority.

25. The apparatus of claim 22, wherein the first message is a MAC-CE message.

* * * * *